(12) United States Patent
Vescio

(10) Patent No.: US 9,747,570 B1
(45) Date of Patent: Aug. 29, 2017

(54) METHOD AND SYSTEM FOR RISK MEASUREMENT AND MODELING

(71) Applicant: Secure Systems Innovation Corporation, Reston, VA (US)

(72) Inventor: Robert Vescio, Reston, VA (US)

(73) Assignee: Secure Systems Innovation Corporation, Reston, VA (US)

( * ) Notice: Subject to any disclaimer, the term of this patent is extended or adjusted under 35 U.S.C. 154(b) by 0 days.

(21) Appl. No.: 15/259,084

(22) Filed: Sep. 8, 2016

(51) Int. Cl.
*G06Q 10/00* (2012.01)
*G06Q 10/06* (2012.01)
*G06F 21/57* (2013.01)
*H04L 29/06* (2006.01)

(52) U.S. Cl.
CPC ....... *G06Q 10/0635* (2013.01); *G06F 21/577* (2013.01); *G06Q 10/063* (2013.01); *H04L 63/1433* (2013.01)

(58) Field of Classification Search
CPC ............. G06Q 10/0635; G06Q 10/063; G06Q 10/0639; G06Q 10/06393; H04L 63/1433; G06F 21/577
See application file for complete search history.

(56) References Cited

U.S. PATENT DOCUMENTS

| | | | | |
|---|---|---|---|---|
| 2008/0082348 A1* | 4/2008 | Paulus | ............... | G06Q 30/0278 705/306 |
| 2011/0173693 A1* | 7/2011 | Wysopal | ............. | G06F 11/3612 726/19 |
| 2011/0252479 A1* | 10/2011 | Beresnevichiene | . | H04L 63/1433 726/25 |
| 2012/0123822 A1* | 5/2012 | Hnatio | ................... | G06Q 50/26 705/7.28 |
| 2013/0253979 A1* | 9/2013 | Williams | ........... | G06Q 10/0635 705/7.28 |

OTHER PUBLICATIONS

Sahinoglu, M. "Security Meter: A Practical Decision—Tree Model to Quantify Risk." IEEE Security and Privacy Magazine 3.3 (2005): 18-24.*

* cited by examiner

*Primary Examiner* — William Brockington, III
(74) *Attorney, Agent, or Firm* — Maier & Maier, PLLC

(57) ABSTRACT

A method and system for risk measurement and modeling, which may be used to identify and mitigate information security risks for an information system, and which may improve the efficiency of risk measurement and modeling. Such a system may perform risk modeling based on threat likelihood information, the potential business impacts of particular threats, and data on the effectiveness of particular controls implemented by the operators of the information system, which may be used to calculate residual risk scores for particular risk scenarios that the information system may face.

14 Claims, 18 Drawing Sheets

| Availability Table | | Web Application Attacks | Point of Sale Intrusion | Insider and Privilege Misuse | Miscellaneous Errors | Physical Theft and Loss | Crimeware | Payment Card Skimmers | Cyber Espionage | Denial of Service Attacks | Everything Else |
|---|---|---|---|---|---|---|---|---|---|---|---|
| Servers & Apps | Confidentiality | 6.984 | 6.984 | 6.984 | 6.984 | 6.984 | 6.984 | 6.984 | 6.984 | 6.984 | 6.984 |
| | Integrity | 9.397 | 6.984 | 6.984 | 6.984 | 6.984 | 6.984 | 6.984 | 6.984 | 6.984 | 6.984 |
| | Availability | 10 | 10.000 | 10.000 | 6.984 | 6.984 | 6.984 | 10.000 | 6.984 | 6.984 | 6.984 |
| | CIA Score | 8.794 | 7.989 | 7.989 | 6.984 | 6.984 | 6.984 | 7.989 | 6.984 | 6.984 | 6.984 |
| Network | Confidentiality | 6.984 | 6.984 | 6.984 | 6.984 | 6.984 | 6.984 | 6.984 | 6.984 | 6.984 | 6.984 |
| | Integrity | 7.738 | 6.984 | 6.984 | 6.984 | 3.407 | 6.984 | 6.984 | 6.984 | 6.984 | 6.984 |
| | Availability | 10.000 | 10.000 | 10.000 | 10.000 | 10.000 | 10.000 | 10.000 | 10.000 | 10.000 | 10.000 |
| | CIA Score | 8.241 | 7.989 | 7.989 | 7.989 | 7.287 | 7.989 | 7.989 | 7.989 | 7.989 | 7.989 |
| End-User Systems | Confidentiality | 6.984 | 6.984 | 6.984 | 6.984 | 6.984 | 6.984 | 6.984 | 6.984 | 6.984 | 6.984 |
| | Integrity | 4.311 | 6.984 | 6.984 | 6.984 | 3.407 | 6.984 | 6.984 | 6.984 | 6.984 | 6.984 |
| | Availability | 6.984 | 10.000 | 6.984 | 6.984 | 6.984 | 6.984 | 10.000 | 6.984 | 6.984 | 6.984 |
| | CIA Score | 6.060 | 7.989 | 6.984 | 6.984 | 5.792 | 6.984 | 7.989 | 6.984 | 6.984 | 6.984 |
| Terminal | Confidentiality | 4.878 | 6.984 | 6.984 | 6.984 | 6.984 | 6.984 | 6.984 | 6.984 | 6.984 | 6.984 |
| | Integrity | 5.563 | 6.984 | 6.984 | 6.984 | 4.878 | 6.984 | 6.984 | 6.984 | 6.984 | 6.984 |
| | Availability | 6.984 | 10.000 | 10.000 | 10.000 | 10.000 | 10.000 | 10.000 | 10.000 | 10.000 | 10.000 |
| | CIA Score | 6.142 | 7.989 | 7.989 | 7.989 | 7.287 | 7.989 | 7.989 | 7.989 | 7.989 | 7.989 |
| Media & Offline Data | Confidentiality | 6.984 | 6.984 | 6.984 | 6.984 | 6.984 | 6.984 | 6.984 | 6.984 | 6.984 | 6.984 |
| | Integrity | 3.407 | 6.984 | 6.984 | 6.984 | 6.984 | 6.984 | 6.984 | 6.984 | 6.984 | 6.984 |
| | Availability | 4.878 | 4.878 | 4.878 | 4.878 | 4.878 | 4.878 | 4.878 | 4.878 | 4.878 | 4.878 |
| | CIA Score | 5.090 | 6.282 | 6.282 | 6.282 | 6.282 | 6.282 | 6.282 | 6.282 | 6.282 | 6.282 |
| People | Confidentiality | 6.984 | 6.984 | 6.984 | 6.984 | 6.984 | 6.984 | 6.984 | 6.984 | 6.984 | 6.984 |
| | Integrity | 6.984 | 6.984 | 6.984 | 6.984 | 6.984 | 6.984 | 6.984 | 6.984 | 6.984 | 6.984 |
| | Availability | 4.878 | 4.878 | 4.878 | 4.878 | 4.878 | 4.878 | 4.878 | 4.878 | 4.878 | 4.878 |
| | CIA Score | 6.2820 | 6.2820 | 6.2820 | 6.2820 | 6.2820 | 6.2820 | 6.2820 | 6.2820 | 6.2820 | 6.2820 |

Fig. 7

Implicit Risk

| | POS Intrusion | Web App Attack | Insider Misuse | Theft/ Loss | Misc. Error | Crime-ware | Payment Card Skimmer | DoS Attack | Cyber Espionage | Everything Else |
|---|---|---|---|---|---|---|---|---|---|---|
| Servers & Apps | 20.489 | 87.237 | 28.769 | 1.052 | 17.648 | 26.303 | 1.706 | 62.680 | 3.499 | 24.029 |
| Network | 2.049 | 8.175 | 3.740 | 0.255 | 0.378 | 4.513 | 0.682 | 53.777 | 0.400 | 2.749 |
| End-User Systems | 20.489 | 15.029 | 32.692 | 17.451 | 5.124 | 18.938 | 0.682 | 6.268 | 6.997 | 21.626 |
| Terminal | 20.489 | 0.707 | 8.976 | 0.255 | 0.378 | 0.349 | 17.062 | 0.832 | 0.093 | 9.621 |
| Media & Offline Data | 0.187 | 0.586 | 10.586 | 4.732 | 25.603 | 0.274 | 0.156 | 0.654 | 0.073 | 4.323 |
| People | 1.611 | 15.580 | 29.406 | 9.464 | 25.603 | 5.205 | 0.156 | 0.654 | 4.721 | 19.453 |

Fig. 8A

| 306 → | | | | | | |
|---|---|---|---|---|---|---|
| Certain | 10,000 | 19,283 | 40,059 | 46,824 | 68,519 | 100,000 |
| Very Likely | 6,852 | 13,213 | 20,596 | 31,439 | 46,948 | 68,519 |
| Likely | 4,588 | 8,848 | 13,792 | 21,053 | 31,439 | 45,884 |
| Unlikely | 3,006 | 5,796 | 9,036 | 13,792 | 20,596 | 30,059 |
| Infeasible | 1,928 | 3,718 | 5,796 | 8,848 | 13,213 | 19,283 |
| | | 1,928 | 3,006 | 4,588 | 6,852 | 10,000 |
| | | Insignificant | Low | Moderate | Significant | Catastrophic |

Fig. 8B

| Top 5 Risk Scenarios | Risk Score | Recommendations |
|---|---|---|
| Web Application Attacks: Web Applications | Severe Risk 49.581 | 1. Inventory your web applications monthly and remove unauthorized web applications.<br>2. Continue to scan monthly and remediate OWASP top 10 vulnerabilities. Virtual remediation via the web application firewall is also acceptable.<br>3. Complete the deployment of multifactor authentication within all critical web applications. |
| Denial of Service Attack: Servers & Applications | High Risk 37.804 | 1. Fully implement the DDoS detection and mitigation solution.<br>2. Disable unnecessary services exposed to the internet and block access to known botnet C2 servers.<br>3. Finish patching all external servers and applications and keep patches up to date. |
| Denial of Service Attack: Network | High Risk 31.543 | 1. Fully implement the DDoS detection and mitigation solution.<br>2. Disable unnecessary services exposed to the internet and block access to known botnet C2 servers.<br>3. Be prepared. Run regular DDoS attack simulations to ensure your incident response plan and business continuity plan truly reduce business impact. |
| Insider and Privileged Misuse: End User Systems | Medium Risk 17.931 | 1. Inventory your end user systems monthly and remove unauthorized hardware and software.<br>2. Enforce least privilege by conducting monthly reviews, updating permissions and rights, and disabling guest accounts, admin accounts, and employee accounts that are not needed.<br>3. Block the use of USB ports on all end user systems. |
| Insider and Privileged Misuse: Servers & Applications | Medium Risk 16.467 | 1. Monitor for data exfiltration, which should include volume of data transfers, resource access patterns, time-based activity patterns, indications of job contribution, and time spent per activity that are indicative of job satisfaction.<br>2. Inventory your servers monthly and remove unauthorized hardware and software.<br>3. Enforce least privilege by conducting monthly reviews, updating permissions and rights, and disabling guest accounts, admin accounts, and employee accounts that are not needed. |

Fig. 16

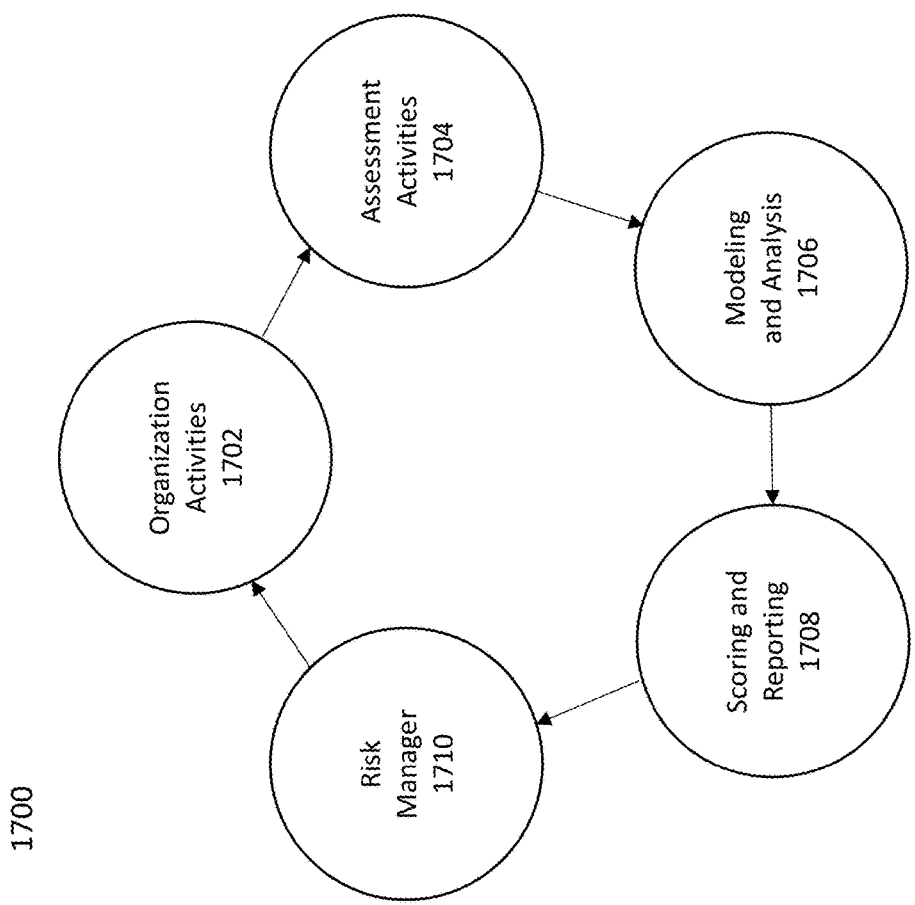

METHOD AND SYSTEM FOR RISK MEASUREMENT AND MODELING

BACKGROUND

A major aspect of risk management for businesses and other institutions is the question of how cyber security and other information system resources should be allocated. Many types of businesses or other institutions face markedly different cyber security and information system threats and potential harm, and cyber security as well as risk managers of these institutions must be able to prioritize their cyber security and information systems resources based on what they anticipate to be the most serious and harmful threats to their operations. Improperly prioritizing resources toward fending off lower-priority threats risks wasting those resources and leaving inadequate resources available for dealing with higher-priority threats.

Existing characterizations of the cybersecurity risks faced by a business or other institution are typically drawn from highly subjective sources, such as questionnaires provided to certain people within the business or the intuition of experts.

What models exist are typically based on a standard risk assessment formula, wherein the risk of a particular cyber-attack is calculated by multiplying the threat of the attack, the apparent vulnerability of the business to the attack, and the estimated cost of the attack actually occurring. This can be expressed as Risk=Threat×Vulnerability×Cost.

However, many problems exist with both of these approaches. Subjective calculations of risk are fundamentally rooted in opinion, and opinions are seldom calibrated. This tends to be true even when the subjective calculations of risk are incorporated into a weighted model; if the data input into the model is flawed, the data output from the model will likewise be flawed no matter how good the model. Purely subjective calculations of risk can also be hard for others to understand or verify, particularly if they do not have the skills or experience that underlie the subjective calculation. For example, other corporate managers outside of a security field may have a hard time understanding the basis for a subjective calculation of risk, and thus may have a hard time appreciating the need to protect the business in specific ways, or the lack of urgent need to protect it in other ways. Mistakes in subjective models can also propagate forward until the initial subjective inputs are verified by someone of equal skill.

Other problems apart from subjectivity also exist. For example, questionnaires are often not based on proven standards, and have little basis for consistency; this means that, for example, in-house security staff and outside consultants may not be able to use the answers to questionnaires prepared by one another without significant revision, as they may be too different. Expert intuition also tends to lack consistency, and may be too narrowly focused on particular aspects of cybersecurity risk. Other sources, such as vendor assessments, often suffer from the same problems.

The common risk formula expressed above is an improvement over pure subjectivity, but is difficult to use consistently; it is often very difficult to define the volume, ratio, probability, or degree of each of the variables. For example, it can often be difficult or impossible for an organization to determine with certainty the potential cost of a threat exploiting one specific vulnerability on a critical system.

SUMMARY

An improved method and system for risk measurement and modeling may be understood. According to an exemplary embodiment, such a method and system may be used to improve the performance of one or more systems, such as information networks, belonging to a business or other organization, by improving the efficiency of resource allocation to address various threats to the one or more systems and improving the quality of information used to manage threats.

As discussed above, typical models for risk measurement and modeling tend to focus on some combination of modeling what threats exist, the cost of being attacked, and the vulnerability of the business to being attacked. However, problems exist with each aspect of these types of models for risk measurement and modeling.

For example, focusing broadly on what threats can exist usually misses the forest for the trees. While it can be somewhat useful to look at generic threat indicators, the actual threats that may exist between one business and another, or even between one industry and another, can often be very different. Many potential threats or risks may be irrelevant for one type of business and highly threatening to another. As such, incorporating industry-specific threat likelihood data instead of generic threat data can represent an improvement in determining how to prioritize security.

In another example, many businesses have a problem quantifying the hard and soft costs that they may endure as the result of a successful attack. For example, a business not engaged in a significant degree of e-commerce, such as a steel manufacturer, may find it difficult to quantify the costs that would be suffered by the business if they were unable to operate their website for some period of time; in another example, a business that does not regularly conduct valuation of its trade secrets may find it difficult to quantify the hard and soft costs of an insider leak of those trade secrets. However, most businesses have a much clearer idea of what kinds of impacts an attack could have that would affect their ability to do business. As such, a method of modeling risk that is instead able to make use of business impact information may represent an improvement over methods of modeling risk that require businesses to conduct more detailed valuations.

In another example, it can be extremely difficult to determine how and where a business might be vulnerable to a particular kind of attack. Typically, the business does not have a good idea of what holes may be present in its own security; if it were aware of such holes, they may attempt to fix them. This means that a thorough examination of security vulnerabilities must be completed every time the security of the business is analyzed. However, while a business typically will not have a good understanding of what lapses are present in its security, it may have a much better idea of what security measures it has implemented. As such, a method of modeling risk that can make use of information about what security controls have been implemented by a business may save time and money and represent an improvement over past methods of modeling risk.

In some exemplary embodiments, structuring a method and system of risk measurement and modeling to make use of information like threat likelihood, business impact, and control effectiveness can have various other advantages as well. For example, this information may be more understandable to a business executive asked to make decisions about the security of the business. Alternatively, something like business impact information may appear less specious to them than, for example, an estimated cost analysis; a conclusion that a given threat could cause a certain degree of business impact may appear much more reliable than a conclusion that a given threat could cause some specific dollar value of harm to the business. This may be useful in making risk measurement and modeling a less-confusing topic for decision makers.

According to an exemplary embodiment, a computer-implemented method of identifying and mitigating information security risks for at least one information system may be provided. Such a method may include: selecting a model for identifying the quantitative residual risk of a risk scenario, the model including a plurality of inputs, including a threat likelihood for the risk scenario, a business impact for the risk scenario, and a control effectiveness for the risk scenario. The risk scenario may be a pairing of a threat type and a targetable system. The method may further include determining, with a processor, a plurality of assessment activities to apply, the determination of assessment activities being based on at least a determination of whether the at least one information system is vulnerable to a threat type. The method may further include determining, with a processor, from the plurality of assessment activities, the threat likelihood of the risk scenario, the business impact for the risk scenario, and the control effectiveness of the risk scenario; generating, with a processor, from the model, the quantitative residual risk of the risk scenario; generating, with a processor, at least one recommendation for reducing the threat likelihood of the risk scenario by making at least one adjustment to the information system, the at least one adjustment being specifically identified in the recommendation; and transmitting, with a processor, the at least one recommendation to an operator of the at least one information system. The operator of the at least one information system may then make their own modifications to the recommendations or to the information system, and the method may be performed again afterwards (or periodically), if desired. In an exemplary embodiment, a computer program product may be configured to perform this method, if desired.

According to another exemplary embodiment, a system for identifying and mitigating information security risks for at least one information system may be provided. The system may include: a non-transitory computer-readable memory; an assessment system including an assessment interface, the assessment system configured to receive one or more scope and expectation details and determine, based on the scope and expectation details, a plurality of assessment activities, the plurality assessment activities comprising one or more business impact assessment activities and one or more control effectiveness assessment activities, the assessment system further being configured to provide one or more of the plurality of assessment activities via the assessment interface (for example, to be completed by the operators of an information system) and optionally may be configured to perform one or more assessment activities automatically (such as scans or tests on the information system). The assessment interface may further be configured to receive a plurality of assessment results and store the plurality of assessment results in the non-transitory computer-readable memory.

The system may further include a modeling and analysis system configured to model the quantitative residual risk of a risk scenario, the risk scenario being or including a pairing of a threat type and a targetable system. Modeling the quantitative residual risk of a risk scenario may include determining, with a processor of the system, a threat likelihood value for the risk scenario, the determination of the threat likelihood data being based on at least historical data, cybersecurity intelligence data, and customer data; determining, with a processor of the system, from the plurality of assessment results, a plurality of confidentiality values, integrity values, and availability values, and combining the plurality of confidentiality values, integrity values, and availability values into a business impact value; determining, with a processor of the system, a control framework, identifying a plurality of control recommendations in the control framework, and determining, from the plurality of assessment results and the plurality of control recommendations, a control effectiveness value; and generating a residual risk value via a model for identifying the quantitative residual risk of a risk scenario, wherein the model has a plurality of inputs, the inputs being, for example, the threat likelihood value, the business impact value, and the control effectiveness value.

The system may further include a scoring and reporting system configured to generate at least one recommendation for reducing the threat likelihood of the risk scenario, the recommendation including, but not limited to, an adjustment to be made to the information system, the scoring and reporting system further being configured to transmit, with a processor and over a network connection, the at least one recommendation to an operator of the at least one information system. The operator of the information system may then take action based on the recommendation.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 7 is an exemplary embodiment of business profile assessment data for a particular business.

FIG. 8A is an exemplary embodiment of an implicit risk data set.

FIG. 8B is an exemplary embodiment of an implicit risk data set.

FIG. 16 is an exemplary embodiment of a recommendation table.

FIG. 17 is an exemplary embodiment of a method of risk measurement and modeling.

DETAILED DESCRIPTION

Figure 1:
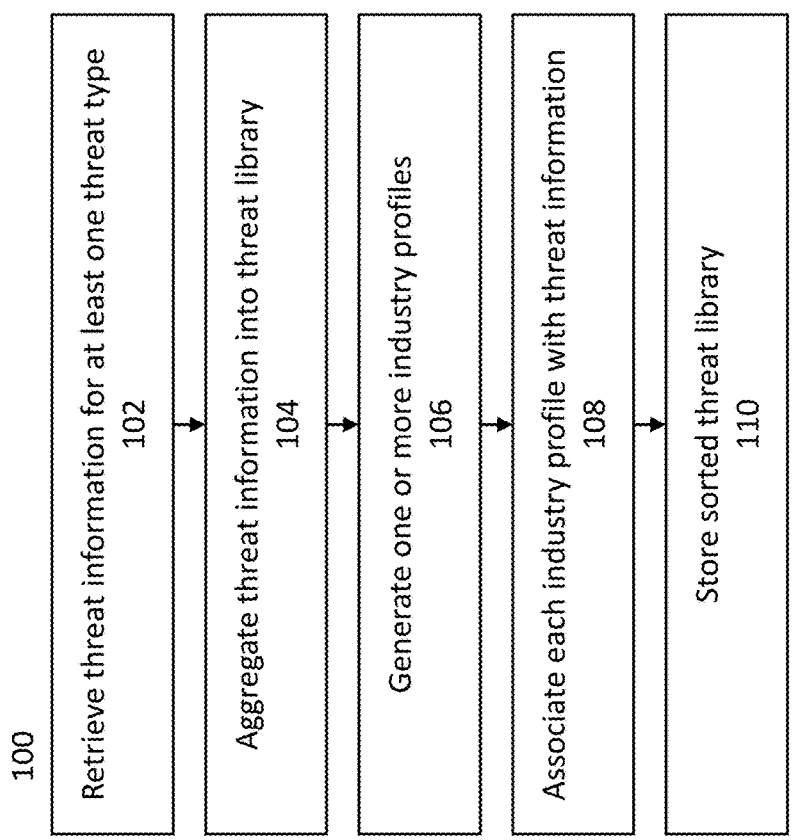
FIG. 1 is an exemplary embodiment of a method of generating a threat library.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

According to an exemplary embodiment, and referring generally to the Figures, various exemplary implementations of a method and system for risk measurement and modeling may be disclosed. According to an exemplary embodiment, a threat model for a method and system for risk measurement and modeling may be structured so as to take into account both objective and subjective data, as may be desired.

For example, according to an exemplary embodiment, a risk measurement and modeling threat model may be constructed based on considerations of the implicit risk of a business (or other institution or organization) to a particular security threat or set of security threats, and considerations of the ability of the business to control for the security threat or set of security threats.

According to an exemplary embodiment, the implicit risk of the business to a particular security threat may be generated based on determinations of the likelihood of the business experiencing a particular security incident and the impact on the business of experiencing the security incident. For example, according to an exemplary embodiment, an Implicit Risk value may be generated by multiplying a value generated to characterize the Threat Likelihood by a value generated to characterize the Business Impact of a particular threat, such that Implicit Risk=Threat Likelihood×Business Impact.

This Implicit Risk value may then be combined with another value characterizing the inability of the business to protect itself against a particular security threat, or to control it from becoming unmanageably large in scope. For example, in an exemplary embodiment, a Control Effectiveness value may be generated, characterizing the ability of the business to protect itself from or otherwise control a particular security threat. This may be represented as, for example, a percentage, with higher percentages indicating that the business is better able to protect itself from the security threat. In an exemplary embodiment, the Implicit Risk value may then be combined with a "control ineffectiveness" value, created by subtracting the Control Effectiveness value from 1, which may represent, for example, a percentage of instances wherein the business is unable to adequately protect itself from the security threat. In an exemplary embodiment, this combination may be represented as Residual Risk=Implicit Risk×(1−Control Effectiveness), or as Residual Risk=Threat Likelihood×Business Impact×(1−Control Effectiveness).

In some other exemplary embodiments, other models incorporating these values may be understood and may be combined other than with multiplication. For example, it may be desirable to represent Control Effectiveness such that a change in Control Effectiveness has an exponential or logarithmic effect on the Residual Risk value of a business or other organization, and the model may be altered accordingly. In another exemplary embodiment, it may be desirable to incorporate different inputs into the model, or to split one of the inputs above into several inputs; for example, in an exemplary embodiment, the Control Effectiveness of a business may be represented in the model by separate values for network control effectiveness and physical control effectiveness.

Turning now to exemplary FIG. 1, FIG. 1 displays an exemplary embodiment of a method of generating a threat library 100, the threat library containing threat likelihood inputs for incorporation into a risk assessment model. A threat library may be generated according to a method of generating a threat library 100 by, first, retrieving threat information for at least one type of security threat 102. Threat information may be retrieved 102 from one or more industry sources, such as specific threat intelligence sources having statistics on security incidents or from other data, or may otherwise be generated from collective intelligence, as desired. In another exemplary embodiment, threat information may also be generated and stored based on, for example, subjective intelligence, and may be retrieved 102 in that form, as may be desired.

In a next step, threat information that has been retrieved 102 from one or more sources may be aggregated into a threat likelihood library 104. In some embodiments, sets of information originating from more than one source may be stored individually within the threat likelihood library, which may allow, for example, one set of information originating from one threat intelligence source to be updated whenever the threat intelligence source updates their data. In another exemplary embodiment, threat likelihood information may be stored in the form of combined threat likelihood library information, if desired.

In a next step, the threat likelihood library may be filtered based on an industry profile in order to define specific threat likelihood values for an industry. In a first part of this step, one or more industry profiles may be generated 106. Industry profile information may include, for example, information on the typical practices of the industry, such as the types of systems typically used by the industry.

In a next step, a generated industry profile 106 may be paired with threat information 108. Threat information may include, for example, information on attacks that may be typically faced by or which may be specifically targeted at particular industries. This information may be derived from, for example, statistics regarding attacks that have been targeted at companies in the industry in the past. For example, according to an exemplary embodiment, industry data for the financial services industry may be derived from statistics on attacks targeted at major and/or minor companies in the financial services industry, such as large banks. The threat information associated with the industry profile 108 may also depend on, for example, the systems typically used within that industry. For example, according to an exemplary embodiment, an industry profile may be generated that indicates that the industry does not typically handle credit card information, and as such no information on attacks intended to steal credit card information (such as credit card skimmer attacks) may be incorporated into the industry profile.

In a next step, the linked industry profiles and sets of threat information may be stored in a sorted threat likelihood library 110. This sorted threat likelihood library may allow threat information for a particular industry to be retrieved by reference to the particular industry.

Figure 2:
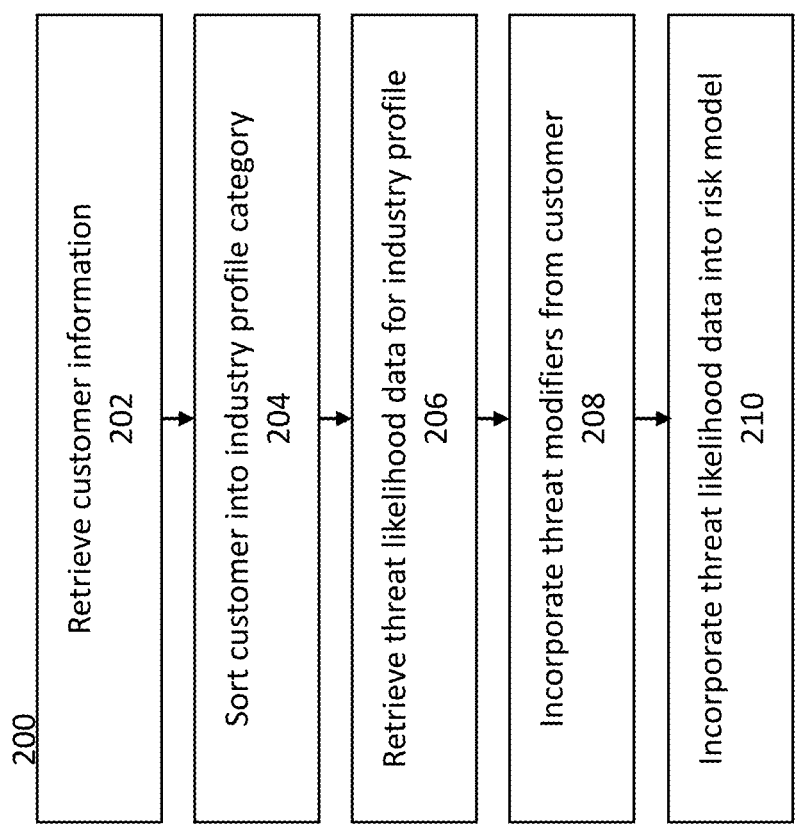
FIG. 2 is an exemplary method by which the contents of a threat likelihood library may be incorporated into a risk model.

Turning now to exemplary FIG. 2, FIG. 2 shows an exemplary method by which the contents of a threat likelihood library may be incorporated into a risk model 200 for a particular customer. In a first step, certain customer information relevant to their business practices may be retrieved 202 and used to sort the customer into one or more industry profile categories 204. Retrieved customer information 202 may be, for example, a manually designated industry profile category for the business, or may be other information that may be used to derive one or more industry profile categories in which to sort the customer into 204, as desired.

In a next step, threat likelihood information associated with a selected industry profile category may then be retrieved from the threat likelihood library 206. In some exemplary embodiments, a customer may be associated with more than one industry profile category. In an exemplary embodiment, one of the industry profile categories may be selected based on some criteria, such as manual specification of one of the industry profile categories, predetermined criteria such as the business's annual revenue in each business category, or otherwise, as desired. In another exemplary embodiment, multiple industry profile categories may be combined; for example, an average or an aggregation of multiple industry profile categories may be generated. In another exemplary embodiment, multiple risk models may be generated for the customer, one for each industry profile category that the customer falls into. Additionally, threat modifiers obtained from a customer may be incorporated 208. These can include customer-specific modifiers pertaining based on unique customer characteristics that may not be apparent to outside parties.

In a next step, the appropriate threat likelihood data retrieved for the customer 210 may be incorporated into a risk model generated for the customer. Alternatively, in some exemplary embodiments, multiple such risk models may be generated, if desired.

Figure 3:
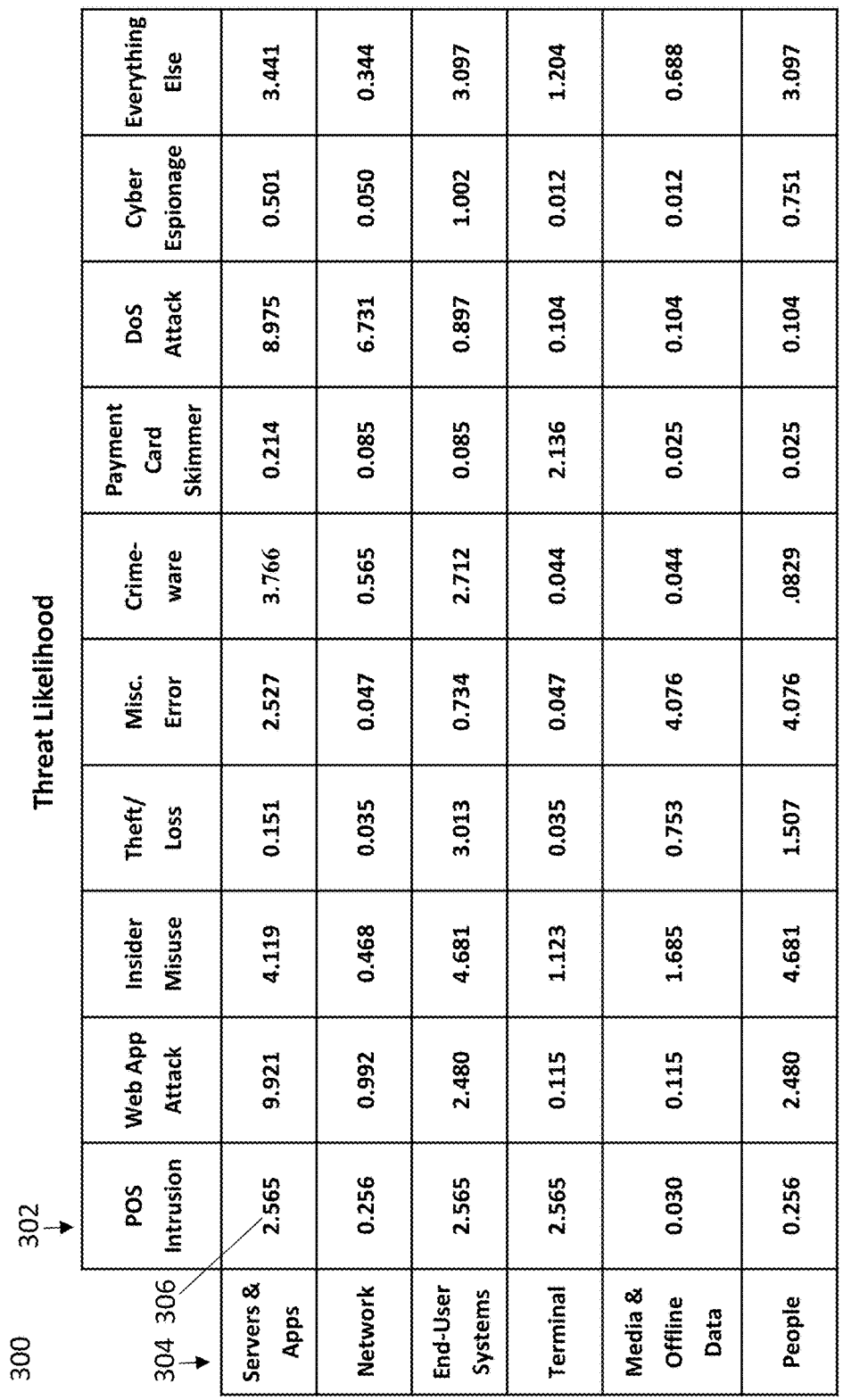
FIG. 3 is an exemplary embodiment of a threat likelihood library.

Turning now to exemplary FIG. 3, FIG. 3 displays an exemplary embodiment of a threat likelihood library 300 for a particular industry profile category, such as, for example, the financial services industry. According to an exemplary embodiment, a threat likelihood library 300 may be sorted by, for example, the type of attack 302 that a business in that industry profile category is likely to face, and how the attack is likely to be directed 304. The combination of a type of attack 302 and system that may be attacked 304 may have a score 306 detailing how likely a particular type of attack 302 is to be made on that system 304. For example, according to the exemplary embodiment displayed in FIG. 3, a web app attack directed against the servers and apps of a business in the industry may be extremely likely, and this combination of attack type 302 and system 304 may be assigned a score 306 of 10.000, indicating the highest level of threat likelihood. Another type of attack 302 directed against a particular system 304, such as a web app attack directed against the network itself, may be substantially less likely to occur and may be assigned a lower score 306, in this case a score of 1.161, indicating a lower level of threat likelihood.

Figure 4:
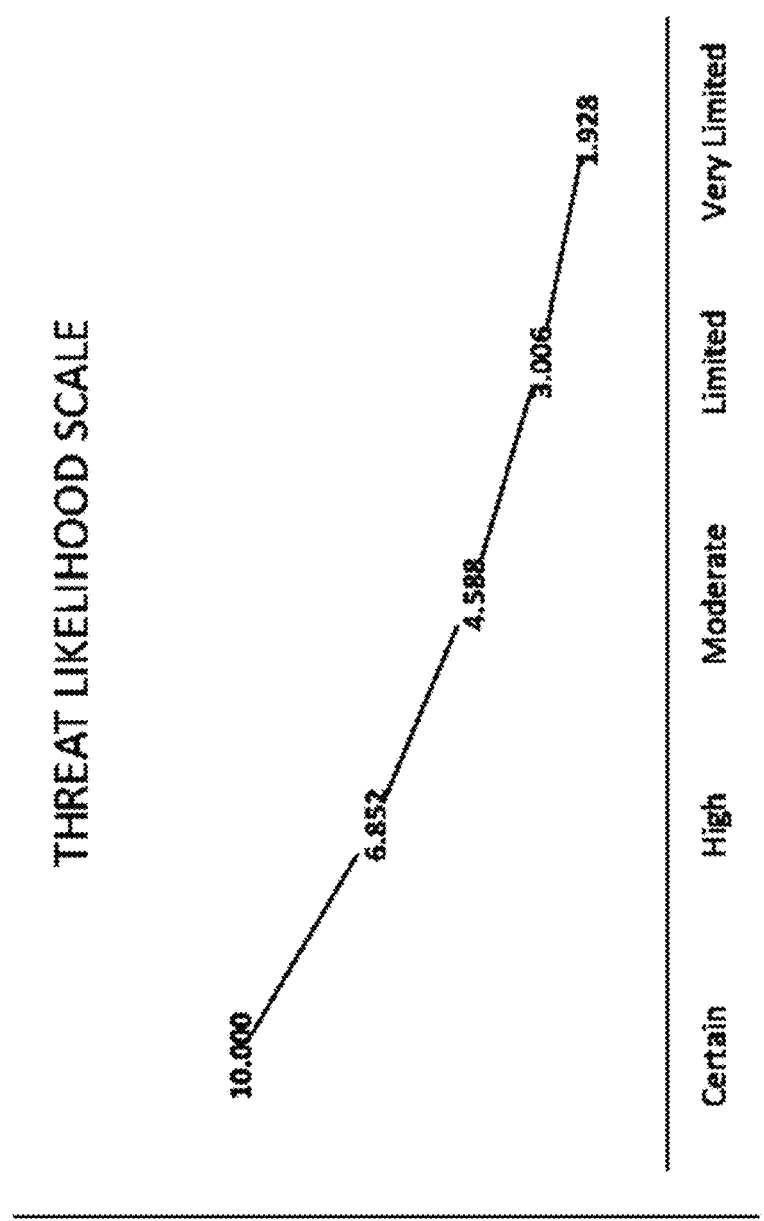
FIG. 4 is an exemplary embodiment of a threat scale.

Turning now to exemplary FIG. 4, FIG. 4 displays an exemplary embodiment of a scale 400 which may be used to transform qualitative threat likelihood data into quantitative threat likelihood data, or which may be used to simplify calculations using quantitative threat likelihood data. The likelihood of a particular threat may be defined first as fitting into a qualitative category; for example, a threat may be assigned into one of the categories shown in FIG. 4, and may for example be a "certain" threat corresponding to an incident that is sure to happen, or may be a lower-probability threat, such as a "very likely," "likely," "even chance," "unlikely," or "very unlikely" threat. Threats may also be classified as "unfeasible," indicating that at the time of performing the risk modeling there is no known way for the security incident to occur. Each of these qualitative values may then be assigned a quantitative value, which may in an exemplary embodiment start at a value of 10.00 for "certain" threats and decrease from there. In some exemplary embodiments, "infeasible" threats may still be given a nonzero baseline value, indicating that while there is presently no known way to perform the attack, such a way may become known in the future. This can ensure that attacks which would be devastating to a business but which are not defended against due to apparent infeasibility are still considered in a final risk analysis.

Figure 5:
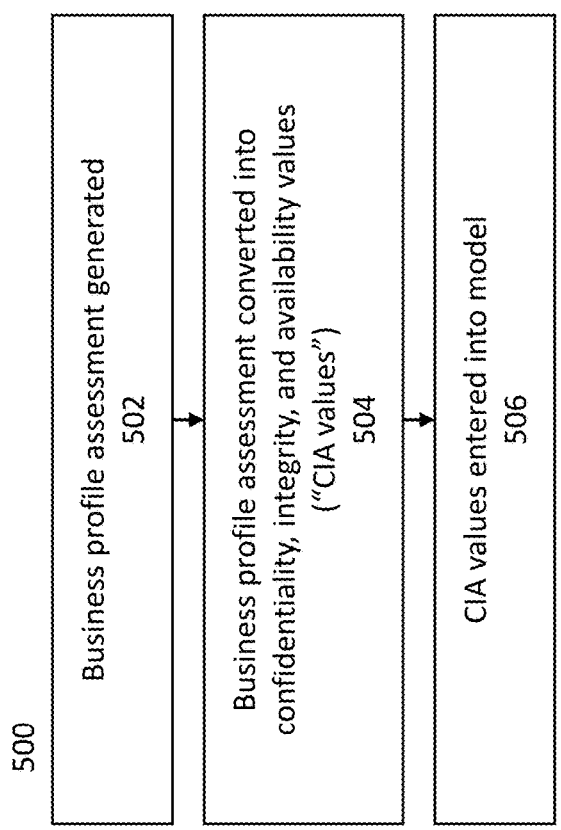
FIG. 5 is an exemplary embodiment of a method by which business impact data particularized to a business or other organization may be incorporated into a model.

Turning now to exemplary FIG. 5, FIG. 5 shows an exemplary embodiment of a method 500 by which business impact data particularized to a business or other organization may be incorporated into a model. In a first step, a business profile assessment may be generated 502. In some exemplary embodiments, a business or other organization may be asked to complete a business profile assessment survey or series of surveys, or otherwise generate business profile assessment data. In other exemplary embodiments, business profile assessment data may be automatically generated; for example, in one exemplary embodiment, a business network may be scanned by security software to generate business profile assessment data.

In a next step, the generated business profile assessment data may be converted into a form that may be incorporated into a model. For example, according to an exemplary embodiment, business profile assessment data may be generated 502 and then may be converted into confidentiality values, integrity values, and availability values, which may represent the confidentiality tolerance, the integrity tolerance, and the availability tolerance for data that a particular organization may have. These may be referred to generally as "CIA values."

In a next step, the CIA values may be entered into a model 506. The converted business profile assessment data may then be combined with threat likelihood data in order to form implicit risk data, if desired.

Figure 6:
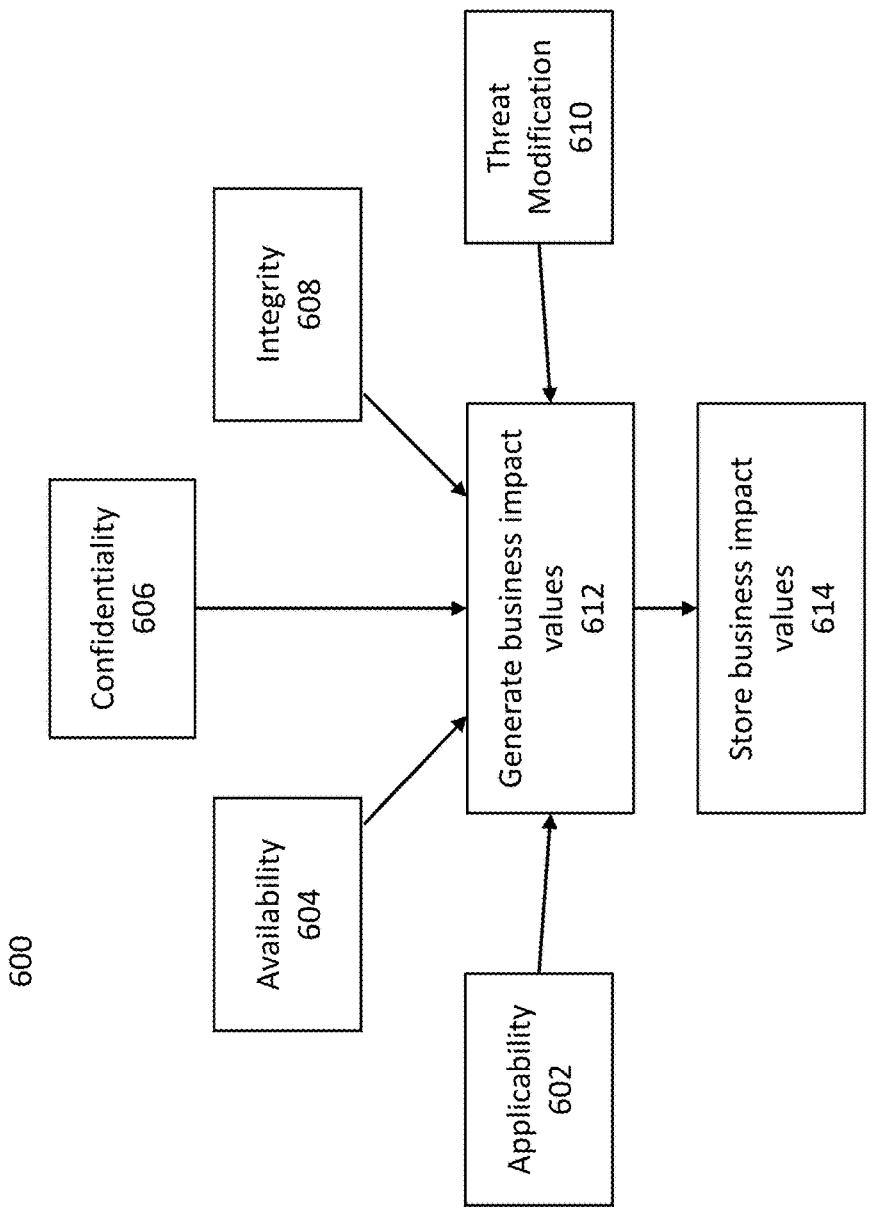
FIG. 6 is an exemplary embodiment of a methodology for collecting business profile assessment data.

Turning now to exemplary FIG. 6, an exemplary methodology for collecting business profile assessment data 600 may be disclosed. According to an exemplary embodiment, information may be solicited in a variety of categories, such as applicability data 602, availability data 604, confidentiality data 606, integrity data 608, and threat modification data 610.

According to an exemplary embodiment, applicability data 602 may be collected by, for example, surveying a business or other organization about particular assets or asset groups that it may have. This data 602 may then be used in order to define asset groups. For example, in one exemplary embodiment, an organization may be asked questions such as "Does your organization have critical web applications?" and "Does your organization have any point of sale systems?" with different scores being assigned to each answer. For example, in an exemplary embodiment, a 1 value may be associated with each "yes" answer, and a "0" value may be associated with each "no" answer. In another exemplary embodiment, non-binary answers may also be solicited; for example, a business may be asked how many independent networks it has, with an integer answer being provided.

According to an exemplary embodiment, availability data 604 may be collected by, for example, surveying a business or other organization to determine the business's need to have particular systems available and under what circumstances. This information may then be used in order to determine the potential impact that that system becoming unavailable might have on the business. For example, according to an exemplary embodiment, a business might be asked "If one or more your critical web applications were unavailable, then how long would it take to notice a business impact? (0 for unknown, 1 for weeks, 2 for days, 3 for hours, 4 for minutes, 5 for seconds)." The business might also be asked similar questions about each of the other systems operated by the business. This information may then be used as or may be used to generate availability data 604.

According to an exemplary embodiment, confidentiality data 606 may be collected by, for example, surveying a business or other organization to determine the type of information that is retained and stored by the business, and what obligations they have to protect that information. For example, according to an exemplary embodiment, a particular business may store trade secrets for their own business or for other businesses, or may store information that is protected by a security clearance. This information may then be used to determine the potential business impact that a breach of confidentiality may have for the business either in general or with respect to specific systems that are designated as having access to confidential information. In an exemplary embodiment, a business may be asked questions like "Do you process, transfer, and/or store trade secrets, financial details, and/or extremely proprietary information within your critical servers or applications? (1 for yes, 0 for no)" or "Do you process, transfer, and/or store PCI, PHI, or PII information within your critical servers or applications? (1 for yes, 0 for no)." The scores for these questions may be used as or may be used to generate confidentiality data 606.

According to an exemplary embodiment, integrity data 608 may be collected by, for example, surveying a business or other organization to determine the business's need for data or hardware integrity. This information may then be used to determine the potential business impact of someone tampering with the business's software or hardware systems. For example, in an exemplary embodiment, a business or other organization may be asked questions like "To the best of your knowledge, how impactful would it be if someone or something tampered with the hardware or software of your critical servers or applications? This includes the installation of malware. (0 for unknown, 1 for very limited, 2 for limited, 3 for moderate, 4 for damaging, 5 for very damaging, 6 for catastrophic)." The scores for these questions may be used as or may be used to generate integrity data 608.

According to an exemplary embodiment, threat modification data 610 may be collected by, for example, surveying a business or other organization to determine the business's threat history, or examining the records or historical results of attacks against the business. This may then be used to make adjustments to other data, such as applicability data 602, availability data 604, confidentiality data 606, or integrity data 608, with these adjustments being based on, for example, the results of previous attacks against the business or the business's historical ability to react to threats. Alternatively, threat modification data 610 may be stored as its own data set.

In an exemplary embodiment, threat modification data 610 may be collected by, for example, asking the business questions such as "Have you experienced a web application attack recently? (0 if unknown, 1 if no, 2 if within the last 30 days, 3 if within the last 90 days, 4 if within the last 180 days, 5 if within the last 365 days)" or "Have you experienced a point of sales intrusion or attack? (0 if unknown, 1 if no, 2 if within the last 30 days, 3 if within the last 90 days, 4 if within the last 180 days, 5 if within the last 365 days)." This information may be stored as threat modification data 610, used to generate threat modification data 610, and/or used to adjust other data, as desired.

Some or all of the applicability data 602, availability data 604, confidentiality data 606, integrity data 608, and threat modification data 610 may be combined in order to generate one or more business impact values 612. These business impact values may then be stored 614, for example in the form of business profile assessment data, which may then be incorporated into a model as may be desired (for example as "CIA values").

In some exemplary embodiments, each of the applicability data 602, availability data 604, confidentiality data 606, integrity data 608, and threat modification data 610 may have different weights in the generation of business impact values 612. In some embodiments, data of different types may inherently have different weights. In other embodiments, more data of some types may be collected than data of other types; for example, in some exemplary embodiments, more questions relevant to a certain type of data may be asked to a business or other organization, and fewer questions to another type of data may be asked. For example, in one exemplary embodiment, only around five questions may be asked of a business in order to determine applicability data 602, whereas around fifteen questions may be asked of a business in order to determine confidentiality data 606. More or fewer questions may also be asked, or may be supplemented with other forms of information gathering, as desired.

Turning now to exemplary FIG. 7, FIG. 7 displays an exemplary embodiment of business profile assessment data 700 for a particular business. For example, in a particular exemplary embodiment, the business may be a financial services organization operating within the financial industry. Business profile assessment data 700 may be sorted by, for example, the type of attack 702 that the business may face, and against what system 704 the attack is likely to be directed. The combination of a type of attack 702 and a system that may be attacked 704 may have a score 706 detailing how impactful a particular type of attack 702 made on a particular system 704 might be for the business.

For example, according to the exemplary embodiment displayed in FIG. 7, the particular business in question, for which the business profile assessment data 700 may have been generated, may not operate payment cards at all, and as such the potential impact of a payment card skimmer-based attack 702—something potentially impactful to other businesses in the financial industry—is zero for this business. Likewise, the business may not operate terminals, such as ATMs, at all, and as such there may be no anticipated impact from attacks 702 made against a terminal of the business, and the score for attacks 702 made on these systems 704 may thus have a score 706 of zero. However, the particular business in question may have much higher impact scores 706 for attacks on its servers and apps; attacks 702 on these systems 704 may be much more damaging to the business's integrity, or ability to protect the confidentiality of its data, or may be more impactful for some other reason. Impact scores 706 for any type of attack 702 on the business's servers and apps may thus be assigned the highest available score, of 10.000.

Turning now to exemplary FIG. 8A, FIG. 8A displays an exemplary embodiment of implicit risk data 800a that may be generated from the combination of data in a threat likelihood library 300 and business profile assessment data 700. Implicit risk data 800a may likewise be categorized by the type of attack 802 and the system that may be vulnerable to an attack 804. In some exemplary embodiments, each of the combinations of attack 802 and system 804 may be given a score 806 based on the combination of the threat likelihood score 306 and the business impact score 706 for equivalent combinations of attack 302, 702 and system 304, 704.

For example, according to an exemplary embodiment, a business or other organization may have a very high threat likelihood score 306 for a particular type of attack 302 directed against a particular kind of system 304, such as a web app attack directed against a server or app, based on the prevalence of that type of attack 302 directed against the industry of which the business is a part. The business or other organization may also have a high business impact score 706 for that kind of attack 702 being made against that kind of system 704. The combination of these scores 306, 706 in the implicit risk data 800a may yield an implicit risk score 806 for that combination of attack 802 and system 804 that is very high. For example, in the exemplary embodiment of FIG. 8a, the implicit risk score 806 for a web app attack 802 directed against a server or app system 804 is a combination of a threat likelihood score 306 of 10 and a business impact score 706 of 10, which in a model wherein the threat likelihood score 306 and the business impact score 706 are multiplied together to yield the implicit risk score 806, yields an implicit risk score 806 of 100.000, a very high implicit risk score 806 value. However, the business impact scores 706 for other attacks 702 or systems 704, such as payment card skimmer attacks 702 and attacks on terminal systems 704, are in each case zero (because the business does not use payment cards or terminals), and as such the threat likelihood score 306 and the business impact score 706 in each of those cases will be multiplied together to yield an implicit risk score 806 of zero. In other exemplary embodiments, other calculation methodologies for implicit risk scores 806 other than the multiplication of a threat likelihood score 306 and a business impact score 706 may also be contemplated, if desired.

Turning now to FIG. 8B, FIG. 8B shows an exemplary embodiment of a table 800b of potential implicit risk score values 806 that may be present for given combinations of threat likelihood scores 306 and business impact scores 706. According to an exemplary embodiment, both threat likelihood scores 306 and business impact scores 706 may be stored as values on a scale; for threat likelihood scores 306, the scale may be from "unfeasible" (corresponding to a threat likelihood score 306 of 1.161) to "certain" (corresponding to a threat likelihood score 306 of 10.000), and for business impact scores 706, the scale may be from "negligible" (corresponding to a business impact score 706 of 1.161) to "catastrophic" (corresponding to a business impact score 706 of 10.000).

Figure 9:
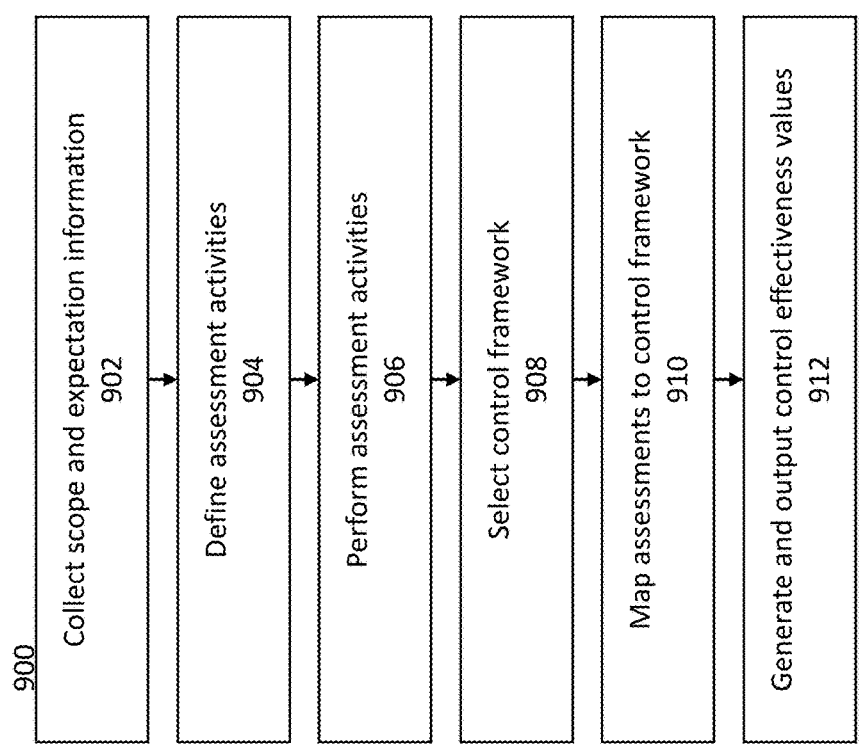
FIG. 9 is an exemplary embodiment of an assessment process for determining one or more control effectiveness values.

Turning now to exemplary FIG. 9, FIG. 9 depicts an exemplary embodiment of an assessment process 900 that may be performed on the systems of a business or other organization in order to determine control effectiveness values for the business or organization. In some exemplary embodiments, an assessment process 900 may be performed on request for a business or organization that is interested in, for example, understanding their cyber risk posture, and may begin by collecting scope and expectation information 902 for that business. This may ensure that the correct analytics are used to analyze the business and its systems 902.

Once scope and expectation information have been collected 902, a set of one or more assessment activities that may be useful in conducting this analysis 904 may be defined. In some exemplary embodiments, assessment activities may be designed in order to determine, in an objective fashion, how well controls have been implemented, for example according to a particular control framework. In some embodiments, assessment activities may be defined 904 such that they look for the volume of weakness that is associated with each assessment, rather than looking for whether a particular bar is cleared or whether a control value can be identified as "validated" or "not validated."

These assessment activities may then be performed 906 and data may be obtained from the results of the assessment activities. Alternatively, in some cases, the business or other organization may conduct its own assessment activities or may have other assessment results available; in such cases, the assessment results provided by the business may be used along with the results of performed assessment activities 906, or may be substituted for the results of performed assessment activities 906, as may be desired.

In some exemplary embodiments, each of the performed assessment activities 906 may produce a set of findings or weaknesses found in one or more of the systems of a business or other organization. Each of the findings may be classified on a scale relating to the severity of the flaw or weakness in the system of the business. For example, in an exemplary embodiment, findings may be classified based on whether they are severe, high, medium-high, medium, medium-low, low, or whether no apparent flaw or weakness was found ("none").

Once assessment activities have been performed 906 and data has been obtained, a control framework may be selected 908 that may be used as a basis for analysis of the data. Note that, in this case, a control framework may be defined as a set of written guidance (or "controls") intended to influence or direct behaviors that reduce risk, improve governance, and/or achieve compliance, and that a control framework may also be referred to by the terms standards, best practices, or regulations. Example control frameworks that may be selected 908 include, for example, the NIST control framework (i.e. NIST SP 800-53A Revision 1 or another revision of same) or the CSC control framework (i.e. the CIS Critical Security Controls for Effective Cyber Defense framework). Each of the assessments, whether collected from performing one or more assessment activities 906 or otherwise collected from the business, may then be mapped into the control framework 910. Each assessment may be provided a maximum value based on how well the assessment validates the control implementation to which it is mapped, which may serve as the basis for one or more effectiveness values that may be generated and output 912. In some exemplary embodiments, in order to ensure standardization, the results of each assessment may be entered into pre-defined input fields; this may ensure that, for example, if multiple data sets taken in different ways are received (for example, if a business data set and an assessment activity data set are both received) the two can be reconciled and put in standard form.

In an exemplary embodiment, data from each assessment may be combined into an overall synergistic control implementation value, which may translate into an overall control effectiveness value that may then be output 912 to characterize the effectiveness of the business at controlling a particular kind of threat or attack directed against a particular system. In some embodiments, a control effectiveness value may be provided on a scale, such that potential control effectiveness values may include "significant," "high," "reasonable," "moderate," "limited," "very limited," or "none/no control effectiveness." Each of these values may be associated with one or more quantitative values for control effectiveness as well, with, for example, values higher up the scale (such as "significant") corresponding to larger numbers or percentages. In other embodiments, quantitative values may be used directly from calculated control effectiveness such that the scale is bypassed, if desired.

Figure 10:
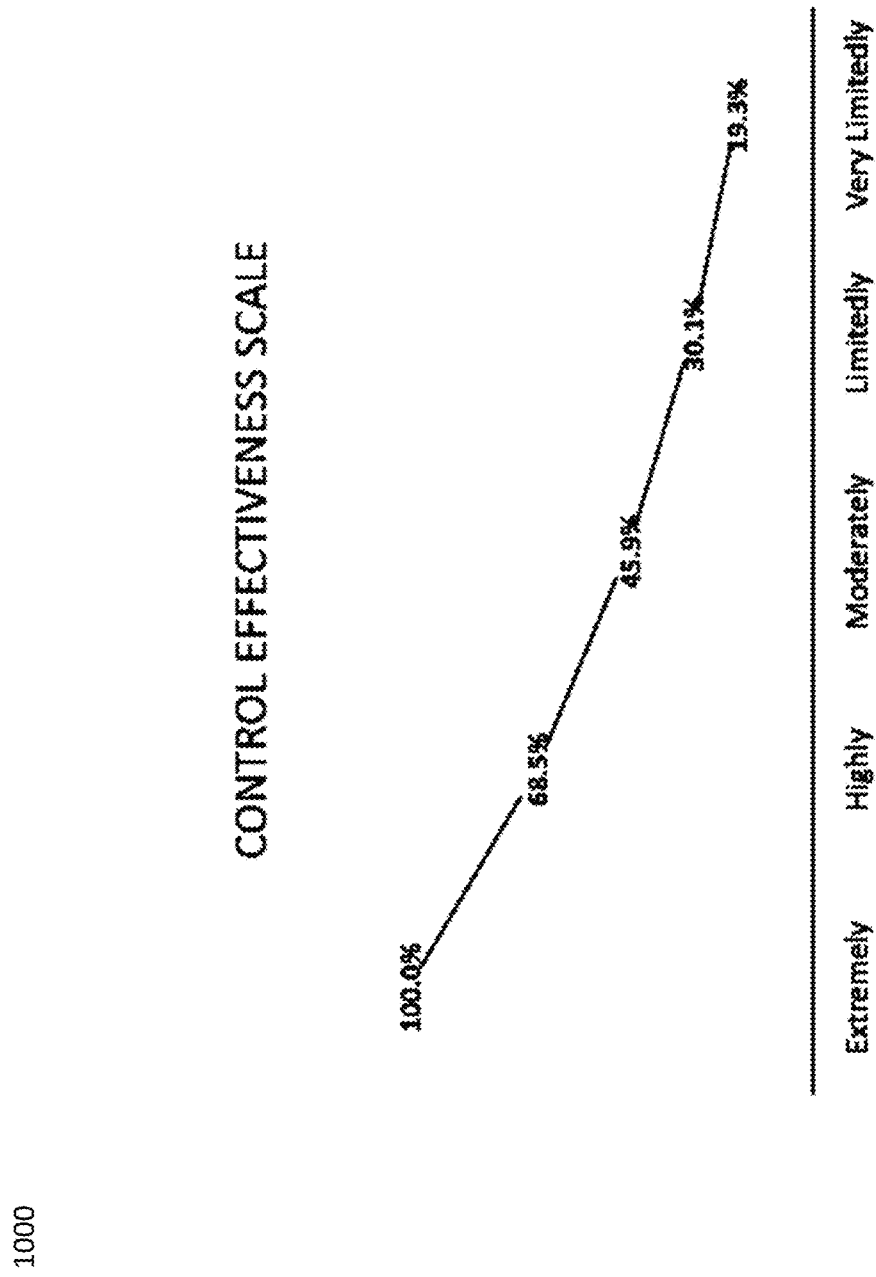
FIG. 10 is an exemplary embodiment of a control effectiveness scale.

Turning now to exemplary FIG. 10, FIG. 10 displays an exemplary embodiment of a scale 1000 which may be used to transform qualitative control effectiveness data into quantitative control effectiveness data, or which may be used to simplify calculations using quantitative control effectiveness data. The ability of the business to control a particular threat may be defined first as fitting into a qualitative category; for example, a threat may be assigned into one of the categories shown in FIG. 10, and may for example be "significant," "high," "reasonable," "moderate," "limited," or "very limited." Control effectiveness values of "none/no control effectiveness" may also be understood, indicating that the business has no ability to control a particular threat at all. Each of these qualitative values may then be assigned a quantitative value, which may in an exemplary embodiment start at a value of 98% (or some other value close to, but not equal to, 100%, based on the recognition that control effectiveness cannot be perfect) and decrease from there.

Figure 11:
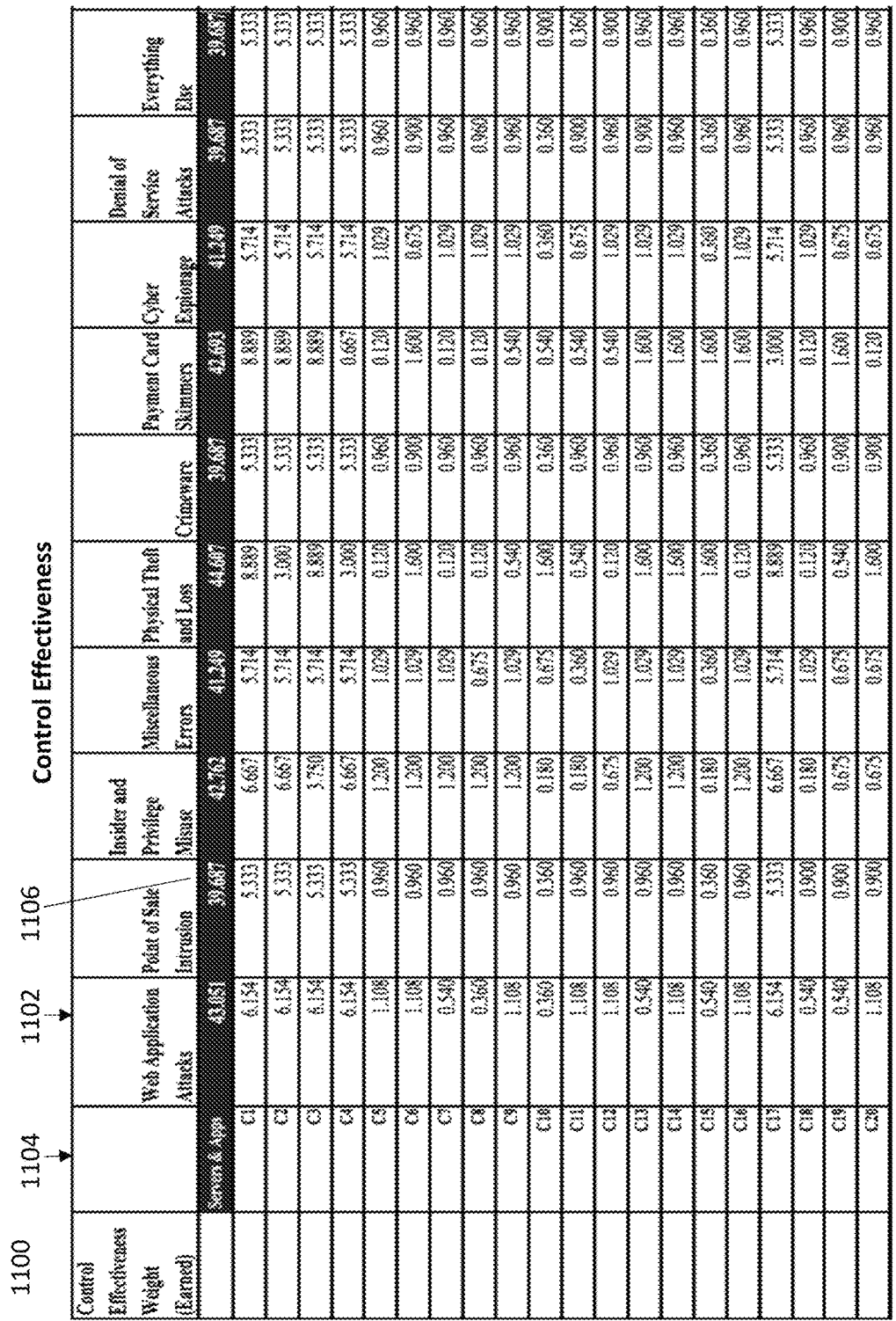
FIG. 11 is an exemplary embodiment of a control effectiveness data set.

Turning now to exemplary FIG. 11, FIG. 11 depicts an exemplary embodiment of a table of control effectiveness data 1100 indicating the effectiveness of a particular business or other organization at controlling any of a variety of threats or attacks. As in previous cases, data may be categorized by attack 1102 and system 1104. In an exemplary embodiment, control effectiveness data values 1106 may be represented as percentages, which may represent the degree to which a particular kind of attack 1102 on a particular kind of system 1104 can be controlled against; in other exemplary embodiments, control effectiveness data values 1106 may be represented otherwise, as may be desired.

For example, in the exemplary embodiment shown in FIG. 11, the analyzed business may not invest any effort into controlling attacks 1102 against terminal systems 1104 or using payment card skimmers, and as such the control effectiveness data values 1106 in each category may be zero percent, representing no control effectiveness whatsoever (which may potentially indicate that the control effectiveness against this attack 1102 or for this system 1104 was not tested in any assessment activities). Other control effectiveness data values 1106 may indicate that the business or other organization is more or less effective at controlling particular kinds of threats; for example, the business's control effectiveness data value 1106 for web app attacks 1102 directed against a server or app system 1104 of the business is 88%, representing that the business has a significant ability to control these sorts of attacks 1102.

Figure 12:
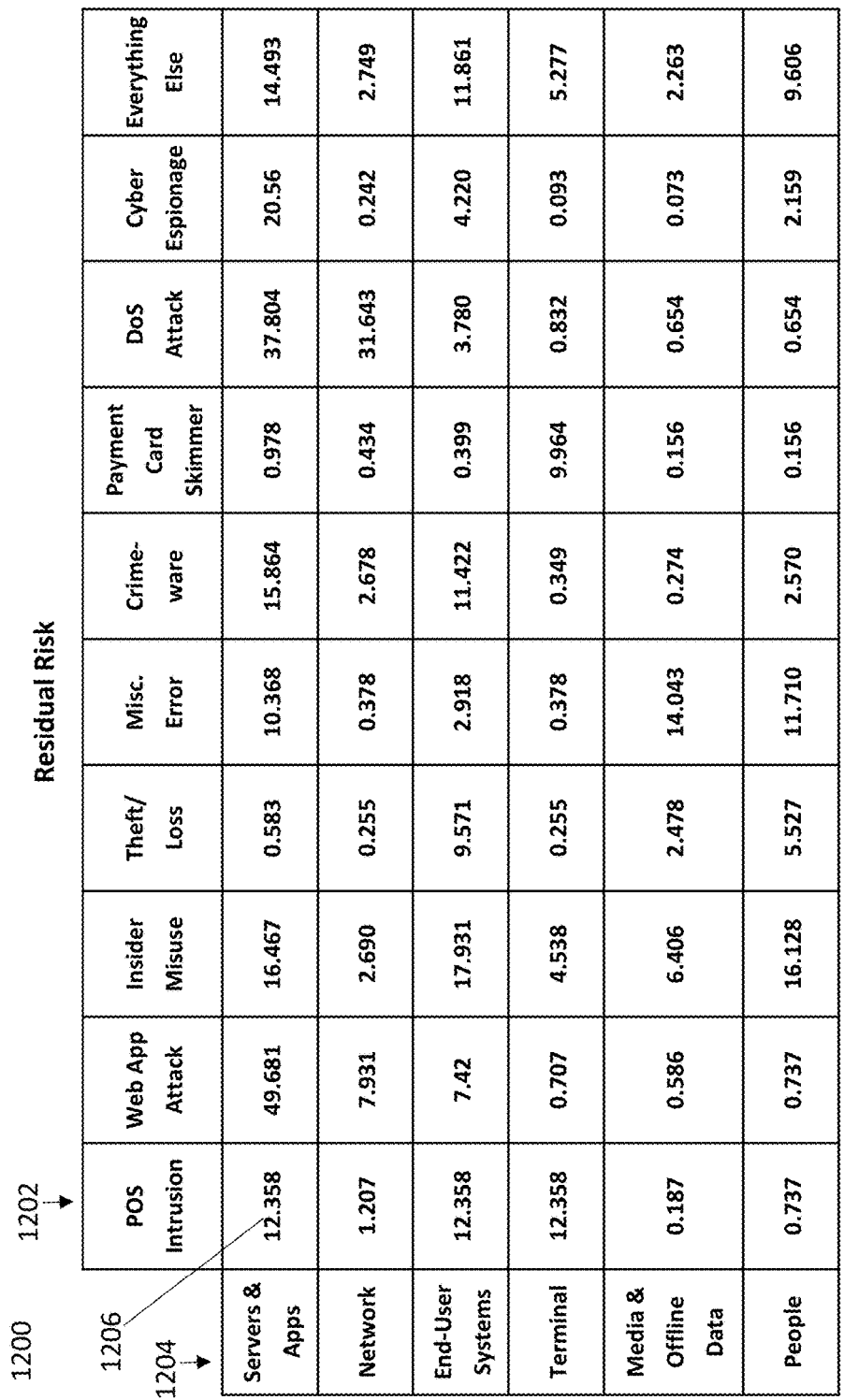
FIG. 12 is an exemplary embodiment of a residual risk data set.

Turning now to exemplary FIG. 12, FIG. 12 depicts an exemplary embodiment of a table of residual risk data 1200 for a particular business, likewise categorized by attack 1202 and system 1204, which may be generated from combining implicit risk data 800a and control effectiveness data 1100. For example, according to an exemplary embodiment, residual risk values 1206 may be generated from implicit risk values 806 and control effectiveness values 1106 by subtracting the control effectiveness values 1106 for a particular attack 1102 and system 1104 combination from 1, and then multiplying the result by the corresponding implicit risk values 806, such that Residual Risk=(Implicit Risk)×(1−Control Effectiveness). This residual risk data 1200 may then be used in order to generate recommendations for the business, along with any other appropriate guidance, as may be desired.

Figure 13:
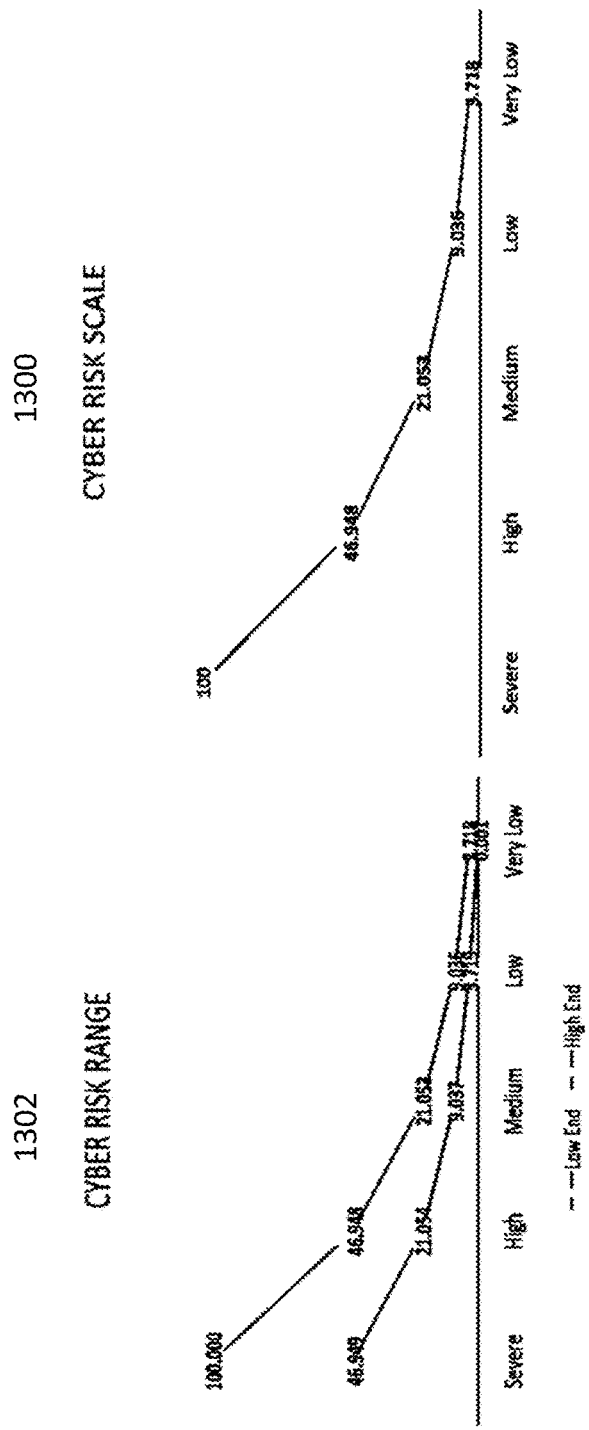
FIG. 13A is an exemplary embodiment of a risk scale range plot for residual risk data.
FIG. 13B is another exemplary embodiment of a risk scale range plot for residual risk data.

Turning now to exemplary FIGS. 13A and 13B, these figures depict an exemplary embodiment of a risk scale range plot 1300 and cyber risk range plot 1302 for residual risk data. In an exemplary embodiment, residual risk data may be categorized on a scale, such that residual risk values over one range are categorized as having a first qualitative label, and such that residual risk values over another range are categorized as having a second qualitative label. For example, in one exemplary embodiment, quantitative values of residual risk from 0 to 100 may be categorized as "severe" (46.949 to 100.000), "high" (21.057 to 46.948), "medium" (9.037 to 21.053), "low" (3.719 to 9.036), or "very low" (0 to 3.718). In an exemplary embodiment, a score of 0 may be used exclusively for risk values corresponding to something that is not applicable, such as a system not used by the business in question.

Figure 14:
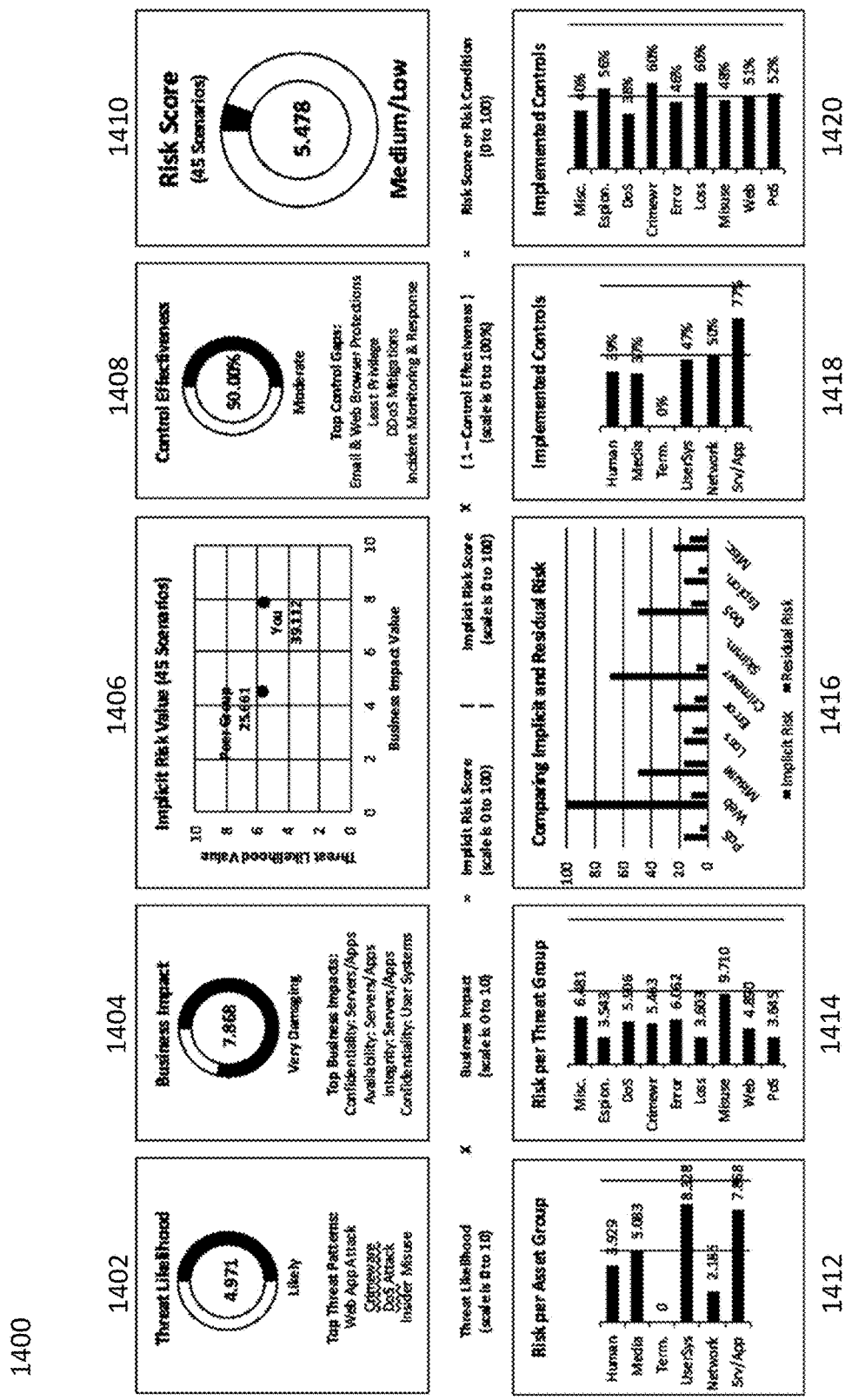
FIG. 14 is an exemplary embodiment of a residual risk report.

Turning now to exemplary FIG. 14, FIG. 14 depicts an exemplary residual risk report 1400 that may be prepared based on residual and implicit risk data. An exemplary embodiment of a residual risk report 1400 may display, first, a threat likelihood summary 1402, which may showcase the total likelihood that the business will be subject to an attack, as well as the most probable kinds of attacks to which the business may be subject. For example, in an exemplary embodiment, a top threat pattern of "web app attack" may be shown, which may indicate that peer businesses in the business's own industry, or in a similar industry, are most likely to be attacked by a web app attack.

Next, a business impact summary 1404 may be shown, which may showcase the impact that attacks may have on the operation of the business, as well as the most potentially disruptive or damaging kinds of attacks, or the target systems that will result in the most disruption for or damage to the business if attacked. In an exemplary embodiment, attacks may be shown by the target system for the attack (for example, servers/apps), as well as the threat categories for that type of attack (in this case, attacks on servers/apps are shown as threatening confidentiality, availability, and integrity of information).

In an exemplary embodiment, an implicit risk summary 1406 may be shown, which may contain, for example, a combination of the results shown in the threat likelihood summary 1402 and the business impact summary 1404. In some exemplary embodiments, an implicit risk summary 1406 may also showcase how the implicit risk to which the business is subject compares to one or more of its peers in the industry. For example, in the exemplary embodiment shown in FIG. 14, a particular business for which an implicit risk summary 1406 has been calculated may have a threat likelihood score of 4.971, slightly smaller than the average threat likelihood value of its peer group, and a business impact score of 7.868, somewhat larger than the average business impact score of its peer group. The smaller threat likelihood score may be, for example, due to the fact that the present business undergoing analysis is a financial services corporation that, unlike many of its peers, does not operate a payment card system, which may make it less subject to threats directed at the payment card system. The larger business impact score may be, for example, due to having more critical systems than some of its peers; for example, the business may conduct high-frequency trading and have critical systems used to perform it. Alternatively, the larger business impact score associated with the present business undergoing analysis may be due to a lack of redundancy of their systems, or excessive dependence on one or a few systems, as compared to their peer group, and may serve as the basis for recommendations on improving the resilience of the business against threats.

In an exemplary embodiment, a control effectiveness summary 1408 may be shown, which may summarize the ability of the business to control threats. According to an exemplary embodiment, a summary score may be generated summarizing the results stored in a control effectiveness data table 1100. In some exemplary embodiments, a summary score to be displayed in a control effectiveness summary 1408 may be generated by, for example, averaging all of the scores stored in the control effectiveness data table 1100; this average value may then be used to characterize the general state of the security of the business. In other exemplary embodiments, a summary score may be generated by a different methodology; for example, in one exemplary embodiment, a summary score may be generated from the control effectiveness scores 1106 of a business in the areas in which the business's control effectiveness is weakest, in order to characterize the state of the security of the business by showing the relative ease with which it could be penetrated or otherwise overcome.

In some exemplary embodiments, a control effectiveness summary 1408 may include a summary of the top control gaps that may be faced by a business. For example, in some exemplary embodiments, control gaps may include inadequate email and web browser protections; a failure on the part of the business to follow the Principle of Least Privilege; inadequate ability on the part of the business to mitigate a DDoS attack, or inadequate incident monitoring and response on the part of the business. In other exemplary embodiments, a control effectiveness summary 1408 may also include a summary of controls that have been well-implemented by a business, in order to give the business some idea of what systems may be less of a priority for improvement.

In an exemplary embodiment, a residual risk summary 1410, incorporating at least a total residual risk score, may be shown. According to an exemplary embodiment, a total residual risk score may be calculated by, for example, averaging or summing some or all of the residual risk scores 1206 stored in a residual risk data table 1200 and using the average or summed value as the total residual risk score, or identifying one or more of the highest residual risk scores 1206 in the residual risk data table 1200 and using these highest values as the total residual risk score. In some exemplary embodiments, the residual risk summary 1410 may also include a qualitative assessment of the residual risk of a business (which may be, for example, "medium/low," or may be higher or lower). In some exemplary embodiments, the residual risk summary 1410 may also include a comparative assessment of the total residual risk score of the business; for example, the total residual risk score of the business may be compared to a residual risk range or value for the industry or for competitors or peers within the industry.

In an exemplary embodiment, a residual risk report 1400 may also include further breakdown of the residual risk of a business, above and beyond the residual risk summary 1410. For example, in an exemplary embodiment, a residual risk report 1400 may include a breakdown of the risks faced by each asset group of the business, in a risks per asset group summary 1412. In an exemplary embodiment, this may include, for example, risk scores for each of the systems 1204 identified in the residual risk data table 1200, for example servers and apps ("Srv/App"), business networks ("Network"), end-user systems ("UserSys"), terminals ("Term."), media and offline data ("Media"), and people ("Human"). In some exemplary embodiments, the scores shown in the risks per asset group summary 1412 may be calculated using the same methodology as the total residual risk score shown in the residual risk summary 1410 (though limited to the residual risk data for the particular system to which they correspond), while in other exemplary embodiments another methodology may be used, as desired.

In an exemplary embodiment, a residual risk report 1400 may also include a breakdown of the risks posed by one or more types of threats to the business, which may be shown in a risk per threat group summary 1414. In an exemplary embodiment, a threat group summary 1414 may show the risks posed to the business by, for example, point-of-sale intrusion ("PoS"), web app attack ("Web"), insider misuse ("Misuse"), theft/loss ("Loss"), miscellaneous errors ("Error"), crime-ware ("Crimewr"), payment card skimmers, DoS attack ("DoS"), cyber espionage ("Espion."), and everything else not otherwise included ("Misc."). In some exemplary embodiments, types of attacks that are not considered to pose risks because of the business's lack of a particular system (such as, in this case, payment card skimmer attacks) may not be shown in a risks per threat group summary 1414, if desired.

In another exemplary embodiment, a comparison summary 1416 for implicit risk and residual risk may be included. In an exemplary embodiment, a comparison summary 1416 may show implicit risk and residual risk sideby-side, such that the implicit risk and the residual risk in each of a variety of categories can be easily compared. For example, in the exemplary embodiment shown in FIG. 14, two side-by-side bars may be displayed, with an implicit risk value being shown as a bar on the left and a residual risk value being shown as a bar on the right. In cases where the ability of the business to control risk is high, for example in the case of web app attacks, the implicit risk bar may be much higher than the residual risk bar next to it. In other cases, where the ability of the business to control risk is somewhat lower, the implicit risk bar may be higher to the residual risk bar to a lesser degree, or may even not be higher than the residual risk bar, for example in the case of misuse.

In another exemplary embodiment, summaries of the controls that have been implemented by a business 1418, 1420 may be included and may be shown. In an exemplary embodiment, separate summaries may be provided for the controls that have been implemented by the business 1418, 1420, a first summary 1418 providing the control scores associated with certain systems of the business and a second summary 1420 providing the control scores associated with certain types of attacks. Control scores may, like the residual risk scores included in other summaries 1412, 1414, be calculated similarly to or in a different way from the control effectiveness score provided in a control effectiveness summary 1408.

Figure 15:
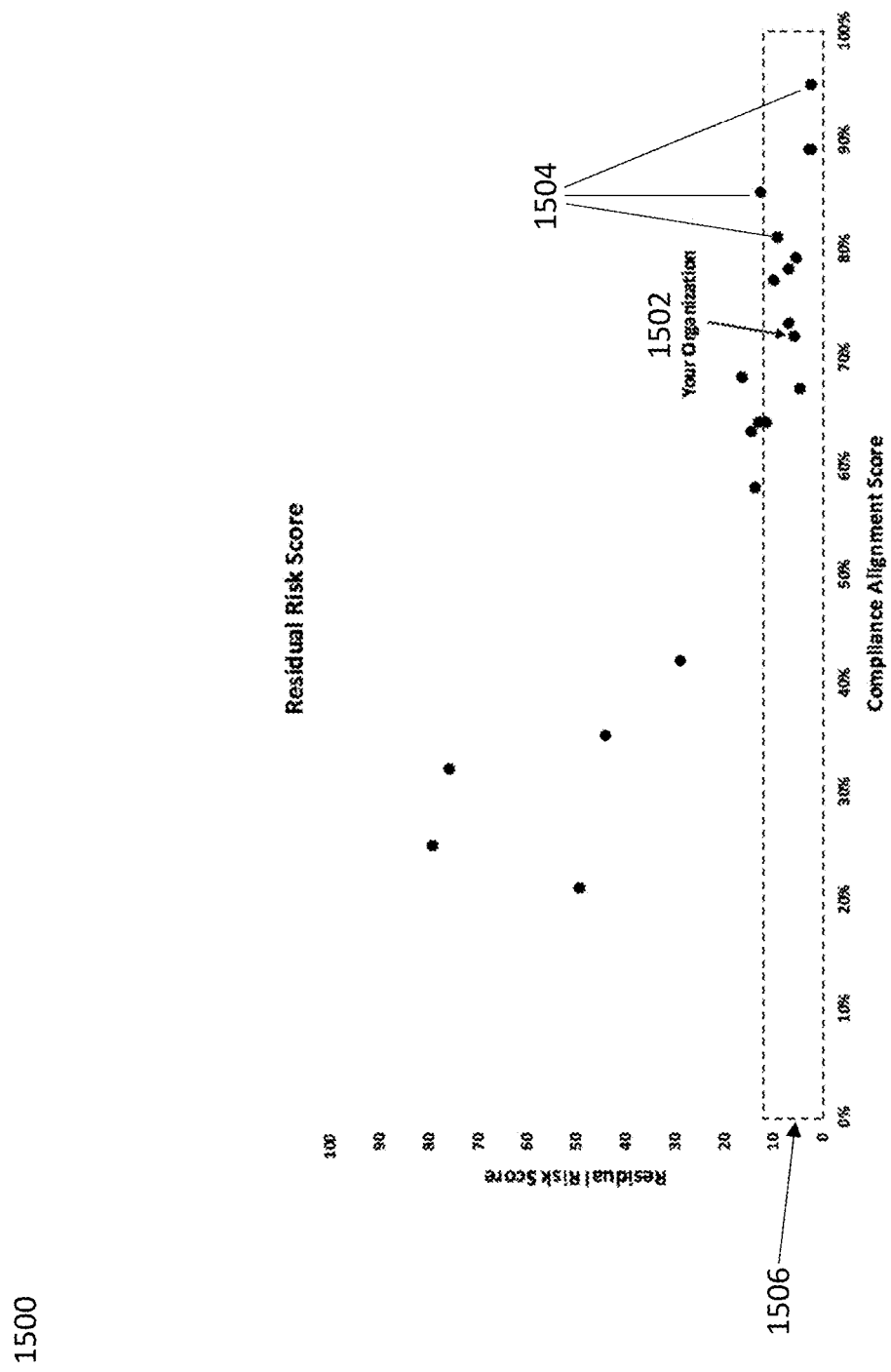
FIG. 15 is an exemplary embodiment of an industry comparison chart.

Turning now to FIG. 15, FIG. 15 shows an exemplary embodiment of an industry comparison chart 1500. In an exemplary embodiment, an industry comparison chart 1500 may show a data point 1502 corresponding to the present business undergoing analysis, as well as one or more other data points 1504 corresponding to other businesses, which may be competitors or peers of the present business undergoing analysis or which may be classified within the same industry. In an exemplary embodiment, data points 1502, 1504 may be plotted based on the compliance alignment score of each of the businesses (indicating the degree to which they comply with one or more control frameworks, such as NIST or CSC) and the residual risk score to which each of the businesses is subject. In some exemplary embodiments, data points 1504 may be anonymized and no other information other than that there is a business in the industry having the score in question may be available. In other exemplary embodiments, data points 1504 may have, for example, some identifying information about the business, if desired.

In an exemplary embodiment, an industry comparison chart 1500 may display an area corresponding to a set level of risk, for example a "medium" level of risk, to which businesses may be subject. This risk threshold 1506 may be shown as, for example, a dotted line or dotted-lined-area on the industry comparison chart 1500, and may be used to show whether the present business undergoing analysis meets its desired level of risk and how many businesses or other organizations meet that desired level of residual risk. In some embodiments, this risk threshold 1506 may be customizable, if desired, so that a different qualitative level of risk or another level of risk may be used as a threshold.

Turning now to exemplary FIG. 16, FIG. 16 shows an exemplary recommendation table 1600 that may be generated for a business undergoing analysis. In an exemplary embodiment, one or more risk scenarios 1602 each having risk scores 1604 may be designated as the basis for recommendations; for example, in an exemplary embodiment, the five risk scenarios 1602 having the highest risk scores 1604 may be selected. In an exemplary embodiment, one or more recommendations 1606 may then be generated for each of those risk scenarios 1602.

In some exemplary embodiments, the generation of recommendations 1606 may be based on, for example, the nature of the risk scenario 1602. For example, a system providing an exemplary recommendation table 1600 may have a library of recommendations 1606 corresponding to particular pairings of types of attacks and types of systems, such that a specific pairing of a type of attack and type of system, such as insider misuse on an end user system, may have recommendations 1606 specifically associated with that pairing which may be provided on a recommendation table 1600. In some embodiments, recommendations 1606 in a recommendation table 1600 may be generated from, for example, automatically or manually reviewing cybersecurity research papers, the recommendations in which may be used to populate a library of recommendations 1606. In another exemplary embodiment, recommendations 1606 may be generated based on questions asked to the business in order to generate, for example, one or more business impact or control effectiveness scores. In other embodiments, recommendations 1606 may otherwise be generated, as may be desired.

In the exemplary embodiment shown in FIG. 16, recommendations 1606 may be generated and provided for a business based on their top five risk scenarios 1602, each of which corresponds to a pairing of an attack and a system having a risk score 1604 within the top five highest risk scores 1604 for that business. These recommendations 1606 may be focused toward reducing the risk score 1604 associated with the risk scenario 1602 by providing the business with ways to increase its control effectiveness, by providing the business with ways to reduce the business impact of a particular attack and system combination, or may otherwise be focused toward decreasing the risk of the business.

For example, in the recommendation table 1600 shown in FIG. 16, a business is shown to have the highest risk scores 1604 associated with a web application attack and denial of service attack on servers and applications. Certain recommendations 1606 may be provided for this risk scenario 1602. For example, it may be recommended for the business inventory web applications and conduct scans, while also utilizing multifactor authentication. It also may be recommended for the business to implement DDoS detection and mitigation solutions, disable unnecessary services and block undesired servers, and continue ongoing patching work. Some number of other recommendations 1606 may then be available after a first recommendation 1606, if desired.

In some embodiments, once one or more of the recommendations 1606 have been implemented or some time has passed, a method for risk measurement and modeling may be scheduled to be performed again in order to generate new recommendations 1606, as desired. Ongoing guidance may also be provided as to how to implement one or more of the chosen recommendations 1606.

In some embodiments, ongoing guidance may be a two-way street, and further guidance may periodically or continuously be solicited from businesses or other organizations that have been analyzed using a method and system for risk measurement and modeling. This guidance may then be used to improve the model. Other refinements to the model, based on previous analyses of a business, may also be made. For example, according to an exemplary embodiment, if a second analysis of a business is conducted after a first analysis has been conducted and a first set of recommendations 1606 have been generated for a business, the threat likelihood values 306 of the second analysis may include threat likelihood values 306 representing changes in how attacks have been performed since the time the first recommendations 1606 were generated. This may be used to show, for example, the business's ability to adapt to a changing threat environment on its own. In another exemplary embodiment, further refinements to the impact scores of a particular business may be made; for example, in an exemplary embodiment, businesses or other organizations may be able to modify their impact values as they better understand their business and associated impacts from different incident levels.

In other exemplary embodiments, other refinements may periodically be made to the models used for one business or more than one business (for example, globally for all businesses), as desired. For example, according to an exemplary embodiment, data (such as threat likelihood data) and data scaling (for example, the identification of a particular data score as having a certain qualitative value, such as "severe," or the threshold at which this identification will be made) may each be further calibrated based on historical patterns, objective-based research, emerging conditions, and customer feedback. In some exemplary embodiments, threat likelihood data may be updated from, for example, one or more threat-based intelligence reports or publications, as well as further conversions of this data (such as division of the data into key industry categories). In some exemplary embodiments, business impact data may be updated based on the reported and estimated impacts of known data breaches, DoS attacks, and other critical incidents reported within a selected industry or within a similar industry to the selected industry. In some exemplary embodiments, control effectiveness data may be updated based on, for example, known data breaches, threat-based intelligence reports, and research reports, as well as data received directly from one or more industries; monitoring of this data may focus on, for example, exploitation details that provide an indication of why and how technical vulnerabilities and organizational weaknesses are being compromised. Other refinements may also be made, as necessary; for example, if a number of businesses report using the method for risk measurement and modeling and then have a significantly different selection of cyberattacks be made against them, the model for those businesses or for all businesses may be updated accordingly.

Turning now to exemplary FIG. 17, FIG. 17 shows an exemplary embodiment of a method of risk measurement and modeling 1700 that may be performed for a business or other organization. According to an exemplary embodiment, a method of risk measurement and modeling 1700 may be initiated by an organization determining to initiate the method of risk measurement and modeling and performing any necessary preparatory activities 1702 that may be desired.

In a next step, one or more assessment activities 1704 may be performed. According to an exemplary embodiment, this may include, for example, collecting appropriate scope and expectation details in order to design an analysis tailored to the business, if desired. Based on the scope and expectation details, a set of assessment activities may be defined. These activities may either be performed on the systems of the business or may be completed based on available data, such as the results of one or more assessments that had already been completed, as may be desired.

In a next step, one or more modeling and analysis activities 1706 may be performed. According to an exemplary embodiment, once data has been collected, applicable risk scenarios and threat likelihood values may be selected. The results of the assessments (or other data, such as data collected from the organization) may then be input into a risk model for risk processing.

In a next step, one or more scoring and reporting activities 1708 may be performed. According to an exemplary embodiment, the results from the model may be used to generate a cyber risk report, which may then be used as the basis for guidance and other assistance to or within an organization, as may be desired.

In a next step, one or more risk measurement and modeling modifications 1710 may be made to the report, such as by stakeholders in the organization or in another part of the organization, as may be desired. This may include, for example, prioritizations of particular remediations based on the goals of the stakeholders.

Coming back full circle, the organization may then take steps 1702 to actually implement the proposed recommendations, and may then optionally run the procedure again, such as after implementing one or more of the proposed recommendations or at a later time.

For illustrative purposes, an exemplary embodiment of an implementation of a method of risk measurement and modeling, proceeding through each step and making use of specific data, may be provided. However, other exemplary implementations of the method of risk measurement and modeling may also be understood.

According to an exemplary embodiment, a model for risk measurement and modeling may be provided as Residual Risk=Threat Likelihood×Business Impact×(1−Control Effectiveness). Control Effectiveness may be expressed as a percentage.

In an exemplary embodiment, risk may be quantified based on the results of defined risk scenarios, wherein a risk scenario is an intersection of a threat category and a business asset. Each threat category may have a Threat Likelihood, which may be quantified by aggregating cybersecurity intelligence sources and cybersecurity research papers. The asset category may include quantifications of business impact, control effectiveness, and control implementation. For the purposes of this example, a web application attack intersecting with a web application and web application server may be examined.

In order to quantify the threat likelihood of a web application attack, one may first look at data regarding the total number of incidents involving a web application attack out of the total number of security incidents. "A" thus may be defined as the 2015 Incident Count/Total 2015 Incidents=5,344/64,222=8.3%. (Other years other than 2015 may also be used.)

This value A may then be scaled by another value, "B." In this case, B may be set equal to the appropriate quantitative value on the threat likelihood scale for the threat in question, divided by the maximum incident percent of volume out of the ten threat categories used in this analysis. In this case, the quantitative value for a "very likely" threat, from the scale, is 0.6984, and the maximum incident percent of volume out of the ten threat categories is 17.7%. As such, B may be 0.6984/17.7%=3.953. "C" may then be set equal to A×B=8.3%×3.953=32.8%.

Moving forward, the quantification of threat likelihood may also take into account the potential severity of the threat as well as its incidence. "D" may be set equal to the percentage chance of data breach, calculated as 2015 Data Breach Count/Total 2015 Data Breaches=908/2,273=39.9%. This may be identified as a "certain" threat condition, and as such "E" may be calculated based on the certainty of the threat condition on the threat likelihood scale, divided by the maximum data breach percent of volume out of the 10 threat categories (which in this case is the same value used above, 39.9%). Therefore, E may be 1.000/39.9%=2.503. "F" may be D×E=39.9%×2.503=100%.

"G" may then be calculated based on the combination of "C" and "F," according to the following logic: G=(((C*0.85)+(F*1.15))/2)*10=(((32.8%*0.85)+(100%*1.15))/2)*10=7.145. In this case, the weights of 0.85 and 1.15 are used to offset how threat likelihood of incidents differs from threat likelihood of data breaches and ensure that the data breach value is given additional weight as compared to incident value.

It should be noted that the resulting value of 7.145 is a value on a scale that is between 0 and 10.000. In this case, 7.145 represents a "certain" threat likelihood.

A value "K" may be calculated based on past data for the industry, which may reduce the effect that an outlier year may have on security recommendations. In an exemplary embodiment, the past three years may be used to generate K, such that "H" equals the 2013 "Industry Specific" incident & breach % based on total incident & breach volume, "I" equals the 2014 "Industry Specific" incident & breach % based on total incident & breach volume, and "J" equals the 2015 "Industry Specific" incident & breach % based on total incident & breach volume. K may thus be equal to (H+I+J)/3=(27.0%+31.0%+48.0%)/3=35.3%. This may then be multiplied by L, wherein L is equal to the scale value of a certain threat category divided by the maximum value of the "past 3-year historical incident & breach percent of volume" out of the 10 threat categories. As K is again the maximum out of the 10 threat categories, L=1.000/35.3%=2.830. M may thus be equal to K×L=35.3%×2.830=100%. To put this in the proper scaled form, a value N may be calculated such that N=M×10=100%×10=10.000.

A value O may then be calculated, representing the average of the recent data G and the historical data N. Thus, O may be equal to (G+N)/2=(7.145+10.000)/2=8.573. The value of O, 8.573, may on a 0-10.000 scale represent a "certain" threat likelihood, showing that the industry-specific data increased the threat likelihood value.

A general threat modifier P may then be calculated based on the aggregated modification weight of one or more cybersecurity intelligence sources. In an embodiment, all of the modification weights may be based on degree of change over a trend period. In this example, one out of the three intel sources illustrated a negative trend, and two out of the three intel sources illustrated a positive trend. The three trends may thus be averaged by combining them, as P=1.231+−0.466+0.180=0.945, or may otherwise be average or combined, as desired.

In an exemplary embodiment, a customer-specific threat modifier may be calculated, based on the experience that the present business undergoing analysis (the "customer") has with cyber incidents. This may be specifically calculated based on the customer answering questions regarding their recent experience with cyber incidents and cyber breaches. In this example, the customer would need to answer one question: Have you experienced a web application attack recently? (The potential answers may be: 0 if unknown, 1 if no, 2 if within the last 30 days, 3 if within the last 90 days, 4 if within the last 180 days, and 5 if within the last 365 days.)

In this case, the customer's answer is 0 ("unknown"). In a predefined answer key, 0 equals 0.3407 (rounds to 0.341), which represents an "even chance" threat likelihood on an exemplary scale. This value may be called Q.

A value R may then be calculated based on the combination of O, P, and Q, to represent the total threat likelihood. This may incorporate data on previous historical trends (O), data on whether attacks are trending upward or downward (P), and data specific to the company (Q). R=O+P+Q=8.573+0.945+0.341=9.858, which is a "certain" threat likelihood.

According to an exemplary embodiment, in order to quantify the business impact of a web application attack, a business may be solicited first for applicability values for a particular system (for example, whether the business has the system at all), and may then be solicited for "CIA values" (confidentiality, integrity, and availability). These values may then be used in order to calculate business impact.

In an exemplary embodiment, a customer may be solicited for a value "A", where A is an Applicability Value (determined by the customer answering a question). This question may be, for example, A1=Does your organization have critical web applications? (1 for yes, 0 for no). In this example, the customer answer may be 1. Therefore, Applicability Value=A1=1.

In an exemplary embodiment, a Confidentiality Value may then be calculated for this system, which may be determined by the customer answering a set of questions. For example, a customer may be asked a first question B1, being "Do you process, transfer, and/or store national security secrets within your critical web applications? (1 for yes, 0 for no)." In this example, the customer answer may be 0. In a predefined answer key, 0 equals 0. Therefore, B1=0.

A second question B2 may be "Do you process, transfer, and/or store trade secrets, financial details, and/or extremely proprietary information within your critical web applications? (1 for yes, 0 for no)." In this example, the customer answer may be 0. In a predefined answer key, 0 equals 0. Therefore, B2=0.

A third question B3 may be "Do you process, transfer, and/or store PCI, PHI, or PII information within your critical web applications? (1 for yes, 0 for no)." In this example, the customer answer may be 1. In a predefined answer key, 1 equals 4.878. Therefore, B3=4.878.

In an exemplary embodiment, a Confidentiality Value may be set equal to the maximum value of B1, B2, and B3, which may be the Max Value of 0, 0, 4.878=4.878. Therefore, B may be set equal to 4.878.

According to an exemplary embodiment, an Integrity Value C may be calculated based on, for example, the customer answering a set of questions. In an embodiment, the following questions may be used. A first question C1 may be "To the best of your knowledge, how impactful would it be if someone or something tampered with the hardware or software of your critical web applications? This includes the installation of malware. (0 for unknown, 1 for very limited, 2 for limited, 3 for moderate, 4 for damaging, 5 for very damaging, 6 for catastrophic)." In this example, the customer answer may be 5. In a predefined answer key, 5 equals 6.984. Therefore, C1=6.984.

A second question C2 may be "To the best of your knowledge, how impactful would it be if someone or something tampered with your critical web application logs? (0 for unknown, 1 for very limited, 2 for limited, 3 for moderate, 4 for damaging, 5 for very damaging, 6 for catastrophic)." In this example, the customer answer may be 5. In a predefined answer key, 5 equals 6.984. Therefore, C2=6.984.

A third question C3 may be "To the best of your knowledge, how impactful would it be if someone or something altered the behavior of your critical web applications? (0 for unknown, 1 for very limited, 2 for limited, 3 for moderate, 4 for damaging, 5 for very damaging, 6 for catastrophic)." In this example, the customer answer may be 5. In a predefined answer key, 5 equals 6.984. Therefore, $C3=6.984$.

A fourth question C4 may be "To the best of your knowledge, how impactful would it be if someone or something modified credentials, configurations, privileges, accounts, and/or data within your critical web applications? This includes misrepresentation and misappropriation. (0 for unknown, 1 for very limited, 2 for limited, 3 for moderate, 4 for damaging, 5 for very damaging, 6 for catastrophic)." In this example, the customer answer may be 5. In a predefined answer key, 5 equals 6.984. Therefore, $C4=6.984$.

A fifth question C5 may be "To the best of your knowledge, how impactful would it be if someone or something created a fraudulent transaction from within your critical web applications? (0 for unknown, 1 for very limited, 2 for limited, 3 for moderate, 4 for damaging, 5 for very damaging, 6 for catastrophic)." In this example, the customer answer may be 5. In a predefined answer key, 5 equals 6.984. Therefore, $C5=6.984$.

In an exemplary embodiment, an integrity value C may thus be calculated by averaging the other terms C1-C5. Therefore, the Integrity Value$=(C1+C2+C3+C4+C5)/5=(6.984+6.984+6.984+6.984+6.984)/5=6.984$.

According to an exemplary embodiment, an Availability Value D may be calculated based on, for example, the customer answering a question or set of questions. For example, a customer may be asked a first question D1, "If one or more your critical web applications were unavailable, then how long would it take to notice a business impact? (0 for unknown, 1 for weeks, 2 for days, 3 for hours, 4 for minutes, 5 for seconds)." In this example, the customer answer may be 4. In a predefined answer key, 4 equals 6.984. Therefore, an Availability Value D may be equal to $D1=6.984$.

A Business Impact value E may then be calculated. Because A equals 1 (the business has the system in question), E may be equal to $(B+C+D)/3=(4.878+6.984+6.984)/3=6.282$. (If A equals 1, then E may be equal to $(B+C+D)/3$, while if A equals 0, then E would be 0. 0 would represent no applicability.)

According to an exemplary embodiment, in order to quantify the control effectiveness of a web application attack, a control framework may first be selected. In an exemplary embodiment, the Top 20 Critical Security Controls (CSC) security framework may be selected, though another security framework may be selected, as desired.

In an exemplary embodiment, a number of risk reducing recommendations may be calculated for each risk scenario by aggregating them from one or more cybersecurity research papers. For example, according to an exemplary embodiment, for web application attacks, the following recommendations may be determined to be among the most effective for dealing with that kind of attack.

First, Strong Authentication (that is, effective passwords and/or multifactor authentication) may be recommended as among the top choices for improving the ability of the business to control a web application attack. Other control mechanisms, such as input validation; strong baseline configurations and effective patch management; logging web application, database, and load balancer events; monitoring and alerting based on unusual behavior, fraud, and known web application use cases; regularly conducting an inventory of web application and associated server platforms; and ensuring that there are adequate antivirus and associated malware protections may further improve the ability of the business to control against a web application attack. Some or all of these control mechanisms may be used in the analysis.

In an embodiment, each control in the set may be reviewed, and it may be determined whether each control has applicability with the associated asset and threat category. In this example, CSC #7 (Email and Web Browser Protections) is determined to have no applicability with web applications or web server assets (though it may have applicability for another system).

In an embodiment, each control in the set may be reviewed to determine whether the control aligns with the top recommendations. If there is a direct alignment, then it may be considered a Primary Control. If it complements the top recommendations, then it may be considered a Secondary Control. If it doesn't align directly or complement the top recommendations, but has some risk reducing benefit, then it is considered a Tertiary Control. Primary, Secondary, and Tertiary Controls may be assigned control effectiveness values based on their status as a Primary, Secondary, or Tertiary Control. In an embodiment, the sum of primary controls may represent approximately 85% of total effectiveness. The sum of Secondary Controls may represent approximately 10% total effectiveness. Lastly, the sum of Tertiary Controls may represent approximately 4% total effectiveness. In an embodiment, it may be impossible for the sum of the primary, secondary, and tertiary control values to be 100%, based on the recognition that there will always be unknown conditions.

In an embodiment, the controls in the set may be set to the following values: CSC #1=Primary=9.44; CSC #2=Primary=9.44; CSC #3=Primary=9.44; CSC #4=Primary=9.44; CSC #5=Primary=9.44; CSC #6=Primary=9.44; CSC #7=n/a=0.000; CSC #8=Primary=9.44; CSC #9=Tertiary=1.25; CSC #10=Tertiary=1.25; CSC #11=Tertiary=1.25; CSC #12=Secondary=1.66; CSC #13=Secondary=1.66; CSC #14=Secondary=1.66; CSC #15=Tertiary=1.25; CSC #16=Primary=9.44; CSC #17=Secondary=1.66; CSC #18=Primary=9.44; CSC #19=Secondary=1.66; and CSC #20=Secondary=1.66.

In an exemplary embodiment, one or more assessments may then be used in order to determine how well the customer has implemented the controls. In an embodiment, each control may be assigned an implementation score between 0 and 98%. In this example, the customer may have the following implementation scores: CSC #1=66%; CSC #2=66%; CSC #3=50%; CSC #4=82%; CSC #5=66%; CSC #6=34%; CSC #7=n/a=0.000; CSC #8=34%; CSC #9=18%; CSC #10=34%; CSC #11=18%; CSC #12=66%; CSC #13=18%; CSC #14=18%; CSC #15=98%; CSC #16=50%; CSC #17=66%; CSC #18=34%; CSC #19=66%; and CSC #20=66%.

In an exemplary embodiment, the control effectiveness score may then be multiplied with the implementation score. Following this, each control score will be: CSC #1=9.44×66%=6.23; CSC #2=9.44×66%=6.23; CSC #3=9.44×50%=4.72; CSC #4=9.44×82%=7.74; CSC #5=9.44×66%=6.23; CSC #6=9.44×34%=3.21; CSC #7=0.000×0%=0.00; CSC #8=9.44×34%=3.21; CSC #9=1.25×18%=0.23; CSC #10=1.25×34%=0.43; CSC #11=1.25×18%=0.23; CSC #12=1.66×66%=1.10; CSC #13=1.66×18%=0.30; CSC #14=1.66×18%=0.30; CSC #15=1.25×98%=1.23; CSC #16=9.44×50%=4.72; CSC #17=1.66×66%=1.10; CSC #18=9.44×34%=3.21; CSC #19=1.66×66%=1.10; and CSC #20=1.66×66%=1.10.

A value G may then be calculated, G being the sum of CSC #1 through CSC #20. In this example, this value equals 52.58. A control effectiveness value H may then be calculated by converting G into a percent value: G/100=52.58/100=52.58%.

According to an exemplary embodiment, residual risk may then be calculated from the known values for threat likelihood, business impact, and control effectiveness. In this case, Risk=Threat Likelihood×Business Impact×(1−Control Effectiveness %). Following this calculation, Risk=9.858×6.282×(1−52.58%)=29.366 (high risk).

Note that, in this example, these calculations for residual risk are for one of the combinations of attack and system, and that the calculations would need to be performed again for another combination of an attack and system.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A computer-implemented method of identifying and mitigating information security risks for at least one information system, the method comprising:
    selecting a model for identifying a quantitative residual risk of a risk scenario, wherein the model comprises a plurality of inputs, the inputs comprising a threat likelihood for the risk scenario, a business impact for the risk scenario, and a control effectiveness for the risk scenario, the risk scenario comprising a threat type and a targetable system;
    determining, with a processor, a plurality of assessment activities to apply, the determination of assessment activities being based on at least a determination of whether the at least one information system is vulnerable to the threat type;
    determining, with the processor, from the plurality of assessment activities, the threat likelihood of the risk scenario, the business impact for the risk scenario, and the control effectiveness of the risk scenario;
    generating, with the processor, from the model, the quantitative residual risk of the risk scenario;
    generating, with the processor, at least one recommendation for reducing the threat likelihood of the risk scenario by making at least one adjustment to the information system, the at least one adjustment being specifically identified in the at least one recommendation;
    transmitting, with the processor, the at least one recommendation to an operator of the at least one information system; and
    modifying the at least one information system by making the at least one adjustment;
    wherein determining the threat likelihood of the risk scenario comprises:
    determining a percentage of similar incidents, the percentage of similar incidents comprising a percentage of security incidents involving the threat type of the risk scenario being directed at the targetable system of the risk scenario, out of a total number of security incidents;
    determining a maximum incident percentage of security incidents involving any threat type and being directed at any targetable system, out of the total number of security incidents;
    multiplying the percentage of similar incidents by a scale value; and
    dividing the percentage of similar incidents by the maximum incident percentage to yield a threat likelihood of incidents value;
    wherein, representing the percentage of similar incidents as A, representing the scale value divided by the maximum incident percentage of security incidents involving any threat type and being directed at any targetable system as B, and the threat likelihood of incidents value as C, C=A×B.

2. The method of claim 1, further comprising:
    determining a percentage of similar data breaches involving the threat type of the risk scenario being directed at the targetable system of the risk scenario, out of a total number of data breaches;
    determining a maximum data breach percentage of data breaches involving any threat type and being directed at any targetable system, out of the total number of data breaches;
    multiplying the percentage of similar data breaches by a second scale value; and
    dividing the percentage of similar data breaches by the maximum data breach percentage to yield a threat likelihood of data breaches value;
    wherein, representing the percentage of similar data breaches as D, representing the second scale value divided by the maximum data breach percentage of data breaches involving any threat type and being directed at any targetable system as E, and representing the threat likelihood of data breaches value as F, F=D×E.

3. The method of claim 2, further comprising:
    combining the threat likelihood of incidents value and the threat likelihood of data breaches value by separately weighting each of the threat likelihood of incidents value and the threat likelihood of data breaches value, and then averaging the threat likelihood of incidents value and the threat likelihood of data breaches value into a recent data threat likelihood value.

4. The method of claim 3, further comprising:
    determining a plurality of industry-specific incident and data breach volume percentages for at least one historical year, and averaging the plurality of industry-specific incident and data breach volume percentages into a historical data threat likelihood value; and
    averaging the recent data threat likelihood value and the historical data threat likelihood value into a historical trend-based threat likelihood value.

5. The method of claim 1, wherein determining the business impact of the risk scenario comprises determining, from the plurality of assessment activities, a plurality of results of the plurality of assessment activities, the results comprising a business profile assessment;
    converting the plurality of results of the plurality of assessment activities into a plurality of confidentiality, integrity, and availability values; and
    averaging the plurality of confidentiality, integrity, and availability values.

6. The method of claim 1, wherein the step of generating at least one recommendation comprises:
    automatically populating, from a plurality of research papers, a recommendation library, the recommendation library being sorted by threat type and targetable system; and
    selecting, from a recommendation library, one or more recommendations from the recommendation library corresponding to the threat type and the targetable system.

7. The method of claim 1, further comprising providing ongoing guidance for implementing the at least one recommendation to the operator of the at least one information system.

8. A computer program product embodied on a non-transitory computer-readable medium, comprising code executable by a computer having a processor and a memory, to cause the computer to carry out the following steps:
    selecting a model for identifying a quantitative residual risk of a risk scenario, wherein the model comprises a plurality of inputs, the inputs comprising a threat likelihood for the risk scenario, a business impact for the risk scenario, and a control effectiveness for the risk scenario, the risk scenario comprising a threat type and a targetable system;
    determining, with the processor, a plurality of assessment activities to apply, the determination of assessment activities being based on at least a determination of whether the at least one information system is vulnerable to the threat type;
    determining, with the processor, from the plurality of assessment activities, the threat likelihood of the risk scenario, the business impact for the risk scenario, and the control effectiveness of the risk scenario;
    generating, with the processor, from the model, the quantitative residual risk of the risk scenario;
    generating, with the processor, at least one recommendation for reducing the threat likelihood of the risk scenario by making at least one adjustment to the information system, the at least one adjustment being specifically identified in the at least one recommendation;
    transmitting, with the processor, the at least one recommendation to an operator of the at least one information system; and
    modifying the at least one information system by making the at least one adjustment;
    wherein determining the threat likelihood of the risk scenario comprises:
    determining a percentage of similar incidents, the percentage of similar incidents comprising a percentage of security incidents involving the threat type of the risk scenario being directed at the targetable system of the risk scenario, out of a total number of security incidents;
    determining a maximum incident percentage of security incidents involving any threat type and being directed at any targetable system, out of the total number of security incidents;
    multiplying the percentage of similar incidents by a scale value; and
    dividing the percentage of similar incidents by the maximum incident percentage to yield a threat likelihood of incidents value;
    wherein, representing the percentage of similar incidents as A, representing the scale value divided by the maximum incident percentage of security incidents involving any threat type and being directed at any targetable system as B, and the threat likelihood of incidents value as C, $C = A \times B$.

9. The computer program product of claim 8, wherein the computer is further configured to perform steps comprising:
    determining a percentage of similar data breaches involving the threat type of the risk scenario being directed at the targetable system of the risk scenario, out of a total number of data breaches;
    determining a maximum data breach percentage of data breaches involving any threat type and being directed at any targetable system, out of the total number of data breaches;
    multiplying the percentage of similar data breaches by a second scale value; and
    dividing the percentage of similar data breaches by the maximum data breach percentage to yield a threat likelihood of data breaches value;
    wherein, representing the percentage of similar data breaches as D, representing the second scale value divided by the maximum data breach percentage of data breaches involving any threat type and being directed at any targetable system as E, and representing the threat likelihood of data breaches value as F, $F = D \times E$.

10. The computer program product of claim 9, wherein the computer is further configured to perform steps comprising:
    combining the threat likelihood of incidents value and the threat likelihood of data breaches value by separately weighting each of the threat likelihood of incidents value and the threat likelihood of data breaches value, and then averaging the threat likelihood of incidents value and the threat likelihood of data breaches value into a recent data threat likelihood value.

11. The computer program product of claim 10, wherein the computer is further configured to perform steps comprising:
    determining a plurality of industry-specific incident and data breach volume percentages for at least one historical year, and averaging the plurality of industry-specific incident and data breach volume percentages into a historical data threat likelihood value; and
    averaging the recent data threat likelihood value and the historical data threat likelihood value into a historical trend-based threat likelihood value.

12. The computer program product of claim 8, wherein determining the business impact of the risk scenario comprises determining, from the plurality of assessment activities, a plurality of results of the plurality of assessment activities, the results comprising a business profile assessment;
    converting the plurality of results of the plurality of assessment activities into a plurality of confidentiality, integrity, and availability values; and
    averaging the plurality of confidentiality, integrity, and availability values.

13. The computer program product of claim 8, wherein the step of generating at least one recommendation comprises:
    automatically populating, from a plurality of research papers, a recommendation library, the recommendation library being sorted by threat type and targetable system; and selecting, from a recommendation library, one or more recommendations from the recommendation library corresponding to the threat type and the targetable system.

14. The computer program product of claim 8, wherein the computer is further configured to perform a step of providing ongoing guidance for implementing the at least one recommendation to the operator of the at least one information system.

\* \* \* \* \*